US012634493B2

(12) United States Patent
Guionnet et al.

(10) Patent No.: US 12,634,493 B2
(45) Date of Patent: May 19, 2026

(54) METHOD FOR IMAGE COMPRESSION AND APPARATUS FOR IMPLEMENTING THE SAME

(71) Applicant: ATEME, Velizy Villacoublay (FR)

(72) Inventors: Thomas Guionnet, Rennes (FR);
Marwa Tarchouli, Grenoble (FR)

(73) Assignee: ATEME, Velizy Villacoublay (FR)

( * ) Notice: Subject to any disclaimer, the term of this patent is extended or adjusted under 35 U.S.C. 154(b) by 351 days.

(21) Appl. No.: 18/110,226

(22) Filed: Feb. 15, 2023

(65) Prior Publication Data
US 2023/0300356 A1     Sep. 21, 2023

(30) Foreign Application Priority Data

Feb. 16, 2022    (EP) ..................................... 22305170

(51) Int. Cl.
| | |
|---|---|
| *H04N 19/42* | (2014.01) |
| *G06N 20/00* | (2019.01) |
| *H04N 19/119* | (2014.01) |
| *H04N 19/147* | (2014.01) |
| *H04N 19/176* | (2014.01) |
| *H04N 19/593* | (2014.01) |
| *H04N 19/80* | (2014.01) |

(52) U.S. Cl.
CPC ............. *H04N 19/42* (2014.11); *G06N 20/00* (2019.01); *H04N 19/119* (2014.11); *H04N 19/147* (2014.11); *H04N 19/176* (2014.11); *H04N 19/80* (2014.11); *H04N 19/593* (2014.11)

(58) Field of Classification Search
CPC .... G06N 20/00; H04N 19/119; H04N 19/147; H04N 19/176; H04N 19/42; H04N 19/593; H04N 19/80; H04N 19/86; H04N 19/90
See application file for complete search history.

(56) References Cited

U.S. PATENT DOCUMENTS

2024/0388704 A1* 11/2024 Li ........................ H04N 19/176

FOREIGN PATENT DOCUMENTS

WO     2021/126769 A1     6/2021

OTHER PUBLICATIONS

Zhongzheng ("Block-based Image Coding with Autoencoder and Border Information", May 20, 2020 (May 20, 2020), pp. 1-34, XP055938495, included in IDS dated Feb. 15, 2023.*

(Continued)

*Primary Examiner* — Dave Czekaj
(74) *Attorney, Agent, or Firm* — Faegre Drinker Biddle & Reath LLP

(57)     ABSTRACT

A method for encoding image data of an image divided into a plurality of pixel blocks using a machine learning algorithm, is proposed, which comprises, by a computing platform comprising a processor configured for implementing the machine learning algorithm, for a block of the pixel blocks: obtaining a block neighborhood set of at least one pixel of the image, wherein the at least one pixel is located outside the block in a spatial neighborhood of a corresponding pixel located on an edge of the pixel block, and generating, by the machine learning algorithm configured for performing end-to-end image compression, a bitstream representing the encoded pixel block, by encoding the pixel block based on input data comprising the pixel block and the block neighborhood set.

20 Claims, 12 Drawing Sheets

(56) References Cited

OTHER PUBLICATIONS

Anonymous, "PhD Dissertations and MS Theses—NYU Video Lab," New York City, NY, USA, Jul. 5, 2022, retrieved from: https://wp.nyu.edu/videolab/publications/phd-dissertations-and-ms-theses/ on Jul. 5, 2022, 4 pages.

Balle et al., "End-to-end Optimized Image Compression," ICLR 2017 Conference Paper, arXiv:1611.01704v3, Mar. 3, 2017, pp. 1-27.

Balle et al., "Variational image compression with a scale hyperprior," ICLR 2018 Conference Paper, arXiv:1802.01436v2, May 1, 2018, pp. 1-23.

Cheng et al., "Learned image compression with discretized gaussian mixture likelihoods and attention modules," arXiv:2001.01568v3, Mar. 30, 2020, pp. 1-15.

Cilingir et al., "Image Compression Using Deep Learning," Project Report, 2017, 13 pages.

Dumas, "Deep learning for image compression," PhD Dissertation, Universite de Rennes Comue Universite Bretagne Loire, Jun. 7, 2019, 158 pages.

Jiang et al., "An End-to-End Compression Framework Based on Convolutional Neural Networks," Submitted to IEEE Transactions on Circuits and Systems for Video Technology, arXiv:1708.00838v1, Aug. 2, 2017, pp. 1-13.

Jin et al., "Deep Block Transform for Autoencoders," IEEE Signal Processing Letters, IEEE, USA, May 19, 2021, vol. 28, pp. 1016-1019.

Karunaratne et al., "A rate-distortion optimal video pre-processing algorithm," Proceedings 2001 International Conference on Image Processing, ICIP 2001—Thessaloniki, Greece, Oct. 7-10, 2001, Institute of Electrical and Electronics Engineers, New York, NY, USA, Oct. 7, 2001, vol. 1, pp. 481-484.

Li et al., "An Efficient Deep Convolutional Neural Networks Model for Compressed Image Deblocking, " Proceedings of IEEE International Conference on Multimedia and Expo (ICME) 2017, IEEE, Jul. 10-14, 2017, pp. 1320-1325.

Minnen et al., "Joint Autoregressive and Hierarchical Priors for Learned Image Compression," 32nd Conference on Neural Information Processing Systems (NIPS 2018, Montreal, Canada, arXiv:1809.02736v1. Sep. 8, 2018, 22 pages.

Yasin et al., "Image Compression Based on Deep Learning: A Review," Asian Journal of Research in Computer Science, 2021, vol. 8(1), pp. 62-76.

Yuan, "Block-based Image Coding with Autoencoder and Border Information," Thesis, New York University, May 20, 2020, retrieved from: https://s18798.pcdn.co/videolab/wp-content/uploads/sites/10258/2020/10/Zhongzheng_Yuan_Thesis_Final_Submitted.pdf on Jul. 5, 2022, 34 pages.

Search Report and Search Opinion issued in related application EP 22305170.7, Jul. 15, 2022, 10 pages.

* cited by examiner

1

1'

$$J = R + \lambda . D$$

METHOD FOR IMAGE COMPRESSION AND APPARATUS FOR IMPLEMENTING THE SAME

CROSS-REFERENCE TO RELATED APPLICATIONS

This application claims priority benefit under 35 U.S.C. § 119(d) from European Patent Application No. 22 305 170.7, filed Feb. 16, 2022, the disclosure of which is incorporated by reference herein in its entirety.

FIELD

The present disclosure relates to the field of deep image compression or encoding, in particular end-to-end deep learning models configured for image compression or encoding.

BACKGROUND

Video data is often source encoded so as to decrease the amount of resources necessary for its transmission and/or storage in memory. Various video coding or compression standards that have been developed over the years, such as H.264/AVC, H.265/HEVC or MPEG-2, may be used for that purpose.

In the recent years, given the significant developments in the field of artificial intelligence, approaches of image compression using machine learning algorithms have also been investigated. In particular, studies have been developed for using end-to-end deep learning models for lossy image compression or encoding.

While recently developed deep learning-based image compression schemes can theoretically be used for encoding images of various resolutions, the practical use of such schemes for encoding high resolution images has led to encountering computational resources limitations of the computing platforms running the deep learning model.

In order to alleviate this issue, it has been proposed to divide images to be encoded using a deep learning model into pixel blocks (also sometimes referred to as "patches") of smaller sizes than the original image.

However, dividing an input image into patches, and encoding the patches leads to so-called "block effect" artefacts that deteriorate the visual quality of the reconstructed image that corresponds to the original input image.

There is therefore a need for providing an improved image compression scheme that uses a deep learning model and addresses at least some of the above-described drawbacks and shortcomings of the conventional technology in the art.

SUMMARY

The present subject disclosure provides examples of an improved deep learning-based image compressing scheme and apparatus implementing the same.

The present subject disclosure also provides examples of an improved video encoding or compression and/or video decoding or decompression scheme and apparatuses implementing the same.

The present subject disclosure also provides examples of an improved video encoding and/or decoding scheme and apparatuses implementing the same for alleviating the above-described drawbacks and shortcomings of conventional prediction-based video encoding/decoding schemes, in particular video encoding/decoding schemes using intra prediction encoding of pixel blocks of images of an input video stream to be encoded.

To achieve these improvements and other advantages and in accordance with the purpose of the present subject disclosure, as embodied and broadly described herein, in one aspect of the present subject disclosure, a method for encoding image data of an image divided into a plurality of pixel blocks using a machine learning algorithm is proposed, which comprises, by a computing platform comprising a processor configured for implementing the machine learning algorithm, for a block of the pixel blocks: obtaining a block neighborhood set of at least one pixel of the image, wherein the at least one pixel is located outside the block in a spatial neighborhood of a corresponding pixel located on an edge of the block; and generating, by the machine learning algorithm, a bitstream representing the encoded block, by encoding the block based on input data comprising the block and the block neighborhood set.

The proposed method advantageously addresses the block artefacts issue that may occur when using a patch-based approach for encoding image data using a machine learning algorithm, by using block neighborhood data to encode pixels at the edge of a block (patch) to be encoded. The machine learning algorithm may advantageously be trained to use such block neighborhood data which is provided in its input data in addition to data of the block to be encoded.

In one or more embodiments, wherein the block neighborhood set may comprise a plurality of pixels respectively co-located outside the block in respective spatial neighborhoods of corresponding pixels located on respective edges of the block.

Advantageously, the block neighborhood set may comprise data related to several edges of the block to be encoded, so that the block effect may be mitigated for these edges.

In one or more embodiments, the proposed method may further comprise: obtaining a block extended neighborhood set of a plurality of pixels located outside the block in a spatial neighborhood of respectively corresponding pixels located on one or more edges of the pixel block, and determining the block neighborhood set based on a filtering of pixels of the block extended neighborhood set.

Advantageously, the block neighborhood set provided as input data to the machine learning algorithm for encoding the block, and producing a bitstream representing the encoded block may be generated by first considering an extended neighborhood set, and applying some processing (e.g. filtering) to pixels of the extended neighborhood set so that one or more pixels of the generated block neighborhood set may each carry information regarding a plurality of pixels in the neighborhood of an edge of the block.

In one or more embodiments, the filtering of the pixels may use one or more of a Mean filter and a Gaussian filter.

In one or more embodiments, the proposed method may comprise: performing training of the machine learning algorithm, the training comprising, for encoding training image data of a training image divided into a plurality of training blocks by the machine learning algorithm, for a training block of the pixel blocks: obtaining a training block neighborhood set of at least one pixel of the training image, wherein the at least one pixel is located outside the training block in a spatial neighborhood of a corresponding pixel located on an edge of the training block: generating, by the machine learning algorithm, a bitstream representing the encoded training block, by encoding the training block based on input training data comprising the training block and the training block neighborhood set; generating, by the machine learning algorithm, a reconstructed training block by end-to-end compression of the training block comprising decoding the bitstream; and determining a value of a distortion metric between pixels of the pixel blocks and reconstructed pixels of the reconstructed training block, wherein the distortion metric uses a distance between the at least one pixel of the training block neighborhood set and a pixel reconstructed from the corresponding pixel of the training block.

Advantageously, the machine learning algorithm may be trained to use block neighborhood data to address the block effect by being trained to minimize an improved distortion metric that uses such block neighborhood data for a training block. Such training may advantageously be repeated for a large number of training blocks, such as, for example several hundreds thousands training block.

In one or more embodiments, the training block neighborhood set may comprise a plurality of pixels respectively co-located outside the training block in respective spatial neighborhoods of corresponding pixels located on respective edges of the training block, and the distortion metric may use respective distances between pixels of the plurality of pixels and respectively corresponding pixels of the training block.

In one or more embodiments, the distortion metric may further use respective distances between pixels of the training blocks and corresponding reconstructed pixels output by the machine learning algorithm through coding and decoding the pixels of the training block.

In one or more embodiments, the proposed method may further comprise: determining a value of a rate-distortion cost function J based on the value of the distortion metric.

Advantageously, the machine learning algorithm may therefore be trained to minimize a rate-distortion cost function that uses the improved distortion metric.

In one or more embodiments, the rate-distortion cost function may be of the form $J=R+\lambda \cdot D$, where D is the value of the distortion metric, $\lambda$ is a Lagrangian parameter, and R is an overall bitrate measurement.

In one or more embodiments, the training block may form a M×N matrix of pixels $p(x, y)$, wherein $x=0, \ldots, N-1$, $y=0, \ldots, M-1$, the reconstructed training block corresponding to the training block may form a M×N matrix of pixels $\tilde{p}(x, y)$, wherein $x=0, \ldots, N-1$, $y=0, \ldots, M-1$, and the distortion metric may use one or more of the following distances:

$$\sum\nolimits_{y=0}^{M-1}(p(-1, y) - \tilde{p}(0, y))^2, \sum\nolimits_{x=0}^{N-1}(p(x, -1) - \tilde{p}(x, 0))^2,$$

$$\sum\nolimits_{y=0}^{M-1}(p(M, y) - \tilde{p}(M-1, y))^2, \text{ and } \sum\nolimits_{x=0}^{N-1}(p(x, N))^2 - \tilde{p}(x, N-1)\big)^2,$$

wherein $p(-1, y)$ with $y = 0, \ldots, M-1$ are pixels of a first training block neighborhood subset of the training block neighborhood set, $p(x, -1)$ with $x=0, \ldots, N-1$ are pixels of a second block neighborhood subset of the training block neighborhood set, $p(M, y)$ with $y=0, \ldots, M-1$ are pixels of a third block neighborhood subset of the training block neighborhood set, and $p(x, N)$ with $x=0, \ldots, N-1$ are pixels of a fourth block neighborhood subset of the training block neighborhood set.

In one or more embodiments, the training block neighborhood set may comprise a plurality of pixels respectively co-located outside the training block with respective pixels reconstructed from corresponding pixels located on respective edges of the training block, and the distortion metric may use respective distances between pixels of the plurality of pixels and respectively corresponding pixels of the training block.

In one or more embodiments, the proposed method may further comprise: obtaining a training block extended neighborhood set of a plurality of pixels located outside the training block in a spatial neighborhood of respectively corresponding pixels located on one or more edges of the training block; and determining the training block neighborhood set based on a filtering of pixels of the training block extended neighborhood set.

In another aspect of the present subject disclosure, a method for encoding image data using a machine learning algorithm, the method comprising, by a computing platform comprising a processor configured for implementing the machine learning algorithm: performing training of the machine learning algorithm to perform encoding of a training image divided into a plurality of training blocks, the training comprising, for a training block of the training blocks obtaining a training block neighborhood set of at least one pixel of the training image, wherein the at least one pixel is located outside the training block in a spatial neighborhood of a corresponding pixel located on an edge of the training block: generating, by the machine learning algorithm, a bitstream representing the encoded training block, by encoding the training block based on input training data comprising the training block and the training block neighborhood set: generating, by the machine learning algorithm, a reconstructed training block by end-to-end compression of the training block comprising decoding the bitstream; and determining a value of a distortion metric between pixels of the pixel blocks and reconstructed pixels of the reconstructed training block, wherein the distortion metric uses a distance between the at least one pixel of the training block neighborhood set and a pixel reconstructed from the corresponding pixel of the training block.

In yet another aspect of the present subject disclosure, a method for encoding image data of an image divided into a plurality of pixel blocks using a machine learning algorithm is provided, which comprises, by a computing platform comprising a processor configured for implementing the machine learning algorithm: performing training of the machine learning algorithm, the training comprising, for a block of the pixel blocks: obtaining a block neighborhood set of at least one pixel of the image, wherein the at least one pixel is located outside the block in a spatial neighborhood of a corresponding pixel located on an edge of the pixel block, and determining a value of a distortion metric between pixels of the pixel blocks and reconstructed pixels of a reconstructed pixel block output by the machine learning algorithm through coding and decoding the pixel block, wherein the distortion metric uses a distance between the at least one pixel of the block neighborhood set and a pixel reconstructed from the corresponding pixel of the pixel block, wherein training data used for training the machine learning algorithm to encode the pixel block of the image comprises the pixel block and the block neighborhood set.

In yet another aspect of the present subject disclosure, an apparatus is proposed, which comprises a processor, and a memory operatively coupled to the processor, wherein the apparatus is configured to perform a method according to an embodiment proposed in the present subject disclosure.

In yet another aspect of the present subject disclosure, a non-transitory computer-readable medium encoded with executable instructions which, when executed, causes an apparatus comprising a processor operatively coupled with a memory, to perform a method according to an embodiment proposed in the present subject disclosure, is proposed.

For example, in some embodiments, the present subject disclosure provides a non-transitory computer-readable medium encoded with executable instructions which, when executed, causes an apparatus comprising a processor operatively coupled with a memory, to perform a method for encoding image data of an image divided into a plurality of pixel blocks using a machine learning algorithm, the method comprising, by a computing platform comprising a processor configured for implementing the machine learning algorithm, for a block of the pixel blocks: obtaining, by the processor, a block neighborhood set of at least one pixel of the image, wherein the at least one pixel is located outside the block in a spatial neighborhood of a corresponding pixel located on an edge of the pixel block, and generating, by the processor, by the machine learning algorithm configured for performing end-to-end image compression, a bitstream representing the encoded pixel block, by encoding the pixel block based on input data comprising the pixel block and the block neighborhood set.

As another example, in some embodiments, the present subject disclosure provides a non-transitory computer-readable medium encoded with executable instructions which, when executed, causes an apparatus comprising a processor operatively coupled with a memory, to perform a method for encoding image data using a machine learning algorithm, the method comprising, by a computing platform comprising a processor configured for implementing the machine learning algorithm: performing, by the processor, training of the machine learning algorithm to perform encoding of a training image divided into a plurality of training blocks, the training comprising, for a training block of the training blocks obtaining a training block neighborhood set of at least one pixel of the training image, wherein the at least one pixel is located outside the training block in a spatial neighborhood of a corresponding pixel located on an edge of the training block: generating, by the machine learning algorithm, a bitstream representing the encoded training block, by encoding the training block based on input training data comprising the training block and the training block neighborhood set: generating, by the machine learning algorithm, a reconstructed training block by end-to-end compression of the training block comprising decoding the bitstream; and determining a value of a distortion metric between pixels of the pixel blocks and reconstructed pixels of the reconstructed training block, wherein the distortion metric uses a distance between the at least one pixel of the training block neighborhood set and a pixel reconstructed from the corresponding pixel of the training block.

As yet another example, in some embodiments, the present subject disclosure provides a non-transitory computer-readable medium encoded with executable instructions which, when executed, causes an apparatus comprising a processor operatively coupled with a memory, to perform a method for encoding image data of an image divided into a plurality of pixel blocks using a machine learning algorithm configurable for performing end-to-end image compression, the method comprising, by a computing platform comprising a processor configured for implementing the machine learning algorithm: performing, by the processor, training of the machine learning algorithm, the training comprising, for a block of the pixel blocks: obtaining, by the processor, a block neighborhood set of at least one pixel of the image, wherein the at least one pixel is located outside the block in a spatial neighborhood of a corresponding pixel located on an edge of the pixel block: determining, by the processor, a value of a distortion metric between pixels of the pixel blocks and reconstructed pixels of a reconstructed pixel block output by the machine learning algorithm through coding and decoding the pixel block, wherein the distortion metric uses a distance between the at least one pixel of the block neighborhood set and a pixel reconstructed from the corresponding pixel of the pixel block, wherein training data used for training the machine learning algorithm to encode the pixel block of the image comprises the pixel block, the neighborhood set of pixels.

In yet another aspect of the present subject disclosure, a computer program product comprising computer program code tangibly embodied in a computer readable medium, said computer program code comprising instructions to, when provided to a computer system and executed, cause said computer to perform a method according to an embodiment proposed in the present subject disclosure, is proposed.

In another aspect of the present subject disclosure, a data set representing, for example through compression or encoding, a computer program as proposed herein, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DETAILED DESCRIPTION

Figure 1A:
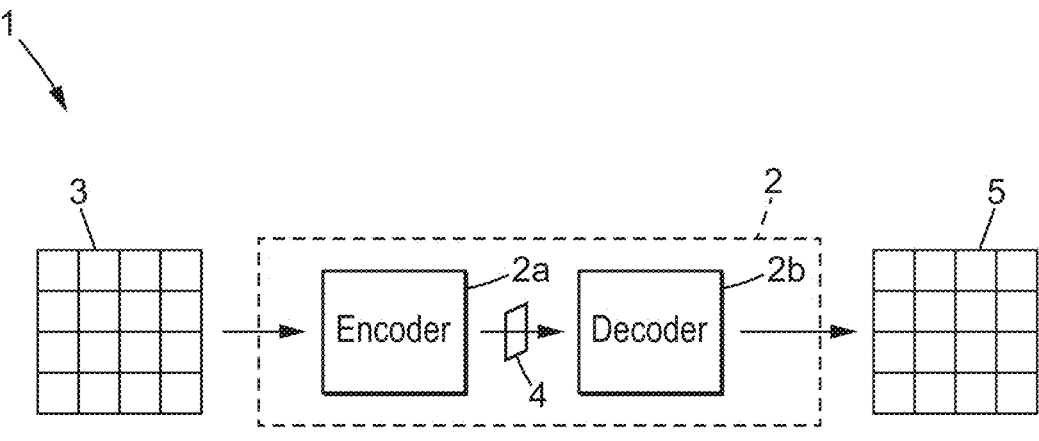
FIG. 1a is a block diagram illustrating an exemplary end-to-end image compression system on which the proposed methods may be implemented in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the present disclosure. Additionally, elements in the drawing figures are not necessarily drawn to scale. For example, the dimensions of some of the elements in the figures may be exaggerated relative to other elements to help improve understanding of embodiments of the present disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, units, subsystems, block diagrams and flowchart illustrations of the methods, systems, and computer program according to one or more exemplary embodiments. Each described function, engine, unit, subsystem, block of the block diagrams and flowchart illustrations can be implemented in hardware, software, firmware, middleware, microcode, or any suitable combination thereof. If implemented in software, the functions, engines, units, subsystems, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fibre, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically." are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

As used herein, the term "pixel" means a picture element or an elementary component of an image, a color component image, or a (luma or chroma) channel type image, and data corresponding thereto, which may be represented by a numeric value, e.g. a natural integer value. A pixel of a digital image may be coded digitally, and its value may be coded into a bitstream. Further, a pixel of an image may represent image data according to color spaces, such as the Y, Cb and Cr color spaces, wherein Y is a luma component of the pixel (also called in the present subject disclosure a luma pixel, a luma sample, or for the sake of simplicity a pixel), and $C_b$ and $C_r$ are the blue-difference and red-difference chroma components of the pixel (also called in the present subject disclosure a chroma pixel, a chroma sample, or for the sake of simplicity a pixel). Two channel types may also be distinguished for a pixel: a luma channel type, corresponding to the luma component of the pixel, and a chroma channel type, jointly designating the chroma components of the pixel. The chroma channel type pixel may itself be divided into the blue-difference (Cb) chroma component and the red-difference (Cr) chroma component. In the following, the term "pixel" may be used to refer, depending on the embodiment and on the image to which it pertains (which may be a YCbCr image, a component image, a chroma component image, a luma component image, etc.), to a pixel of an original image, a luma channel pixel, a chroma channel pixel, a Cb pixel, a Cr pixel, a chroma component pixel, a luma component pixel, a chroma sample, a luma sample, etc.

In the following, the term "plane" may be used to refer to, depending on the embodiment, a color space, a channel type, or a component of the pixel to which all or part of the proposed method may be applied. For example, processing a pixel in the luma plane may correspond to processing a luma component of the pixel (typically associated with a so-called "luminance plane", referred to as the "Y" plane), while processing the pixel in a chroma plane may correspond to processing a chroma component of the pixel (two chrominance planes being generally used and referred to as the "U" and "V" planes, or "Cb" and "Cr" planes). In the following, unless stated otherwise, an operation described as applicable to a pixel may be applied to any pixel component, whether chroma or luma, that is, regardless of whether the pixel represents a luma component or a chroma component of a three-color component pixel. In the following, some embodiments of the proposed methods, apparatuses and computer programs are described for the exemplary processing of pixels of an image in the Y, Cb, and/or Cr planes. However, it will be appreciated by those having ordinary skill in the relevant art that other color spaces, such as, for example, the YUV, Y'CbCr, or RGB color spaces, may be used in place of or in addition to the set of YCbCr color spaces, which is given by way of example only according to embodiments of the present subject disclosure.

The proposed methods may be implemented by any image compression system or video compression system (image encoder, image decoder, video encoder, video decoder, image codec, or video codec) configured for encoding and/or decoding images (or frames), of input image data or video data using a deep learning model implemented by a machine learning algorithm, such as, for example an image compression system or video compression system configured for compression using a deep learning model that uses a neural network, such as, for example, a convolutional neural network, or an image compression system or video compression system configured for compression using a deep learning model that uses one or more autoencoders, as the case may be adapted for implementing one or more embodiments of the proposed methods.

In the following, reference may indifferently be made to a "patch" or a "block" with respect to the context of encoding by a ML algorithm operating in inference mode in order to produce a bitstream corresponding to an encoded representation of the patch or the block or, depending on the embodiment, reference may indifferently be made to a "patch", a "training patch", a "block", or a "training block" with respect to the context of training the ML algorithm for encoding (by the ML algorithm operating in training mode) in order to produce a bitstream corresponding to an encoded representation of the training patch or the training block. In particular, in the context of a ML algorithm operating in training mode, the terms "patch", "training patch", "block", "training block" may be indifferently used to denote a block based on which a distortion value may be determined for training of the machine learning algorithm according to one or more embodiments of the present subject disclosure.

FIG. 1a illustrates an exemplary end-to-end image compression system (1) that may be used in one or more embodiments of the present subject disclosure.

The image compression system (1) may comprise a computing platform configured for running an unsupervised machine learning (ML) algorithm, such as, for example, an autoencoder neural network, on a computing platform subsystem. An ML algorithm subsystem (2) may comprise an image forward encoder subsystem (2a) configured for generating a compressed representation (4) of input image data (3) provided to the forward encoder subsystem (2a), and a backward image decoder subsystem (2b) configured for generating reconstructed image data (5) based on the compressed representation (4) of input image data fed to the backward decoder subsystem (2b).

As shown in FIG. 1a, the ML algorithm subsystem (2) may be configured to generate, in an inference mode, encoded image data (4) by encoding input image data (3), and to generate reconstructed image data (5) by decoding the encoded image data (4) generated by the encoding.

For example, input image data (3), for example depending on the embodiment in the form of an input vector, and input matrix, or an input tensor, may be processed by the forward encoder subsystem (2a) to compute a compressed representation of the input image data (3), which may be fed and processed by the backward decoder subsystem (2b) to compute reconstructed image data (5) corresponding to the input image data (3).

The person skilled in the art will appreciate that any suitable image compression system using a machine learning algorithm to encode image data when operating in inference mode may be used in place of the end-to-end image compression system of FIG. 1a, which is provided as example only.

In one or more embodiments, a training of the ML algorithm used in the image compression system of the present subject disclosure may be performed during a training phase of the ML algorithm.

Figure 1B:
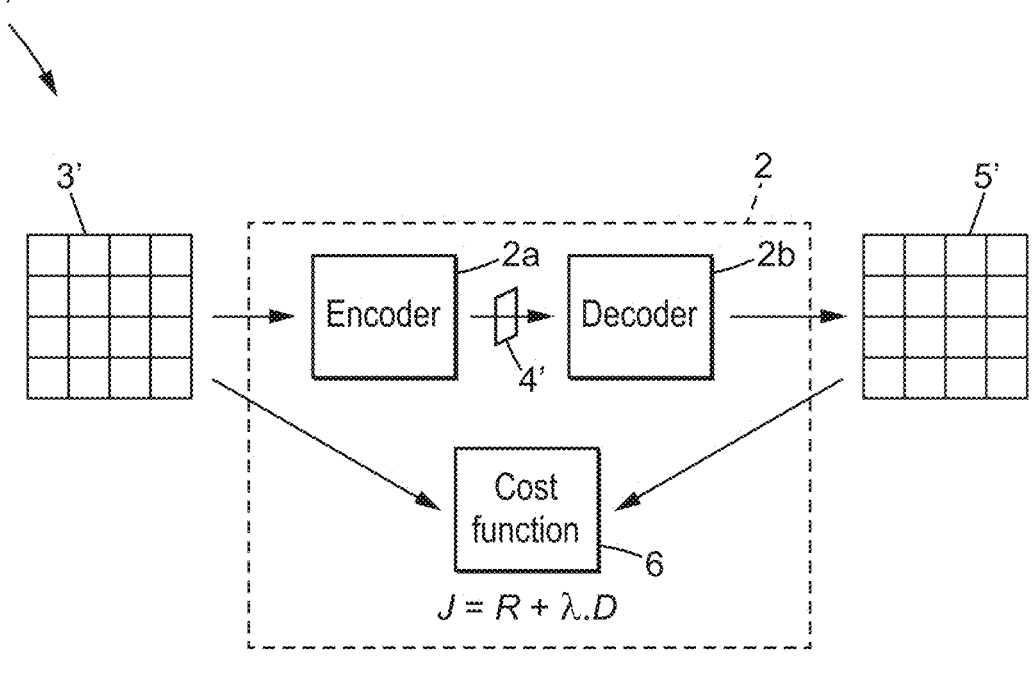
FIG. 1b is a block diagram illustrating an exemplary end-to-end image compression system on which the proposed methods may be implemented in accordance with one or more embodiments.

FIG. 1b illustrates an exemplary end-to-end image compression system (1') that may be used in one or more embodiments of the present subject disclosure for training the ML algorithm used for image compression.

The image compression system (1') of FIG. 1b corresponds to that of FIG. 1a, and FIG. 1b further shows an optimization subsystem (6) of the ML algorithm subsystem (2) that may be used for training of the ML algorithm during the training phase.

The ML algorithm subsystem (2) shown on FIG. 1*b* may in some embodiments be trained using as input data (3') images of a training data set specifically designed for improving performances of the training, such as, for example, the open-source data sets of the Computer Vision Lab of ETH Zurich produced for the Challenge on Learned Image Compression (CLIC).

In some embodiments, the ML algorithm implemented by the ML algorithm subsystem (2) may be trained to minimize distortion, for example through minimizing a loss function.

For example, in some embodiments, the optimization subsystem (6) may be configured for rate-distortion optimization, for example through minimization of a cost function J (which is sometimes also referred to as a loss function).

In some embodiments, images of the input training data set may be processed during respective iterations of a training loop. For an iteration of the training loop, reconstructed image data (5') may be computed by the ML algorithm subsystem (2) based on input image data (3'), through compression of the input image data (3') to generate compressed image data (4') and decompression of compressed image data (4') to generate the reconstructed image data (5'). A cost function J value may then be determined based on the input image data (3') and the reconstructed image data (5'), and fed back to the ML algorithm for a adapting the configuration of the algorithm (e.g. weights of the neural network) based on the cost function value in order to iteratively minimize the cost function through successive iterations of the training loop.

In some embodiments, the cost function may comprise a distortion metric D that estimates a distortion between the original image data (provided as input image data 3'), and the reconstructed image obtained from reconstructed image data (5'). Depending on the embodiments, any suitable metric, such as for example the MSE (Mean Squared Error), SSIM (Structural SIMilarity), or MS-SSIM (Multi-Scale Structural SIMilarity) metric, may be used for calculating the distortion D.

Using the MS-SSIM metric for distortion measurement may be advantageous to obtain a distortion measurement that reflects both objective and subjective distortions.

In some embodiments, the cost function may comprise a rate-distortion cost function that estimates an end-to-end rate-distortion performance, a value of which may be determined based on the value of the distortion metric D. The optimization subsystem (6) may be configured to jointly optimize the rate-distortion performance using the cost function, for example using a Lagrangian optimization scheme.

For example, in some embodiments, a cost function of the form $J=R+\lambda \cdot D$, where D is the value of the distortion metric, $\lambda$ is a Lagrangian parameter, and R is an overall bitrate measurement, may be used during training for optimizing the rate-distortion performance of the encoding performed by the ML algorithm.

Figure 1C:
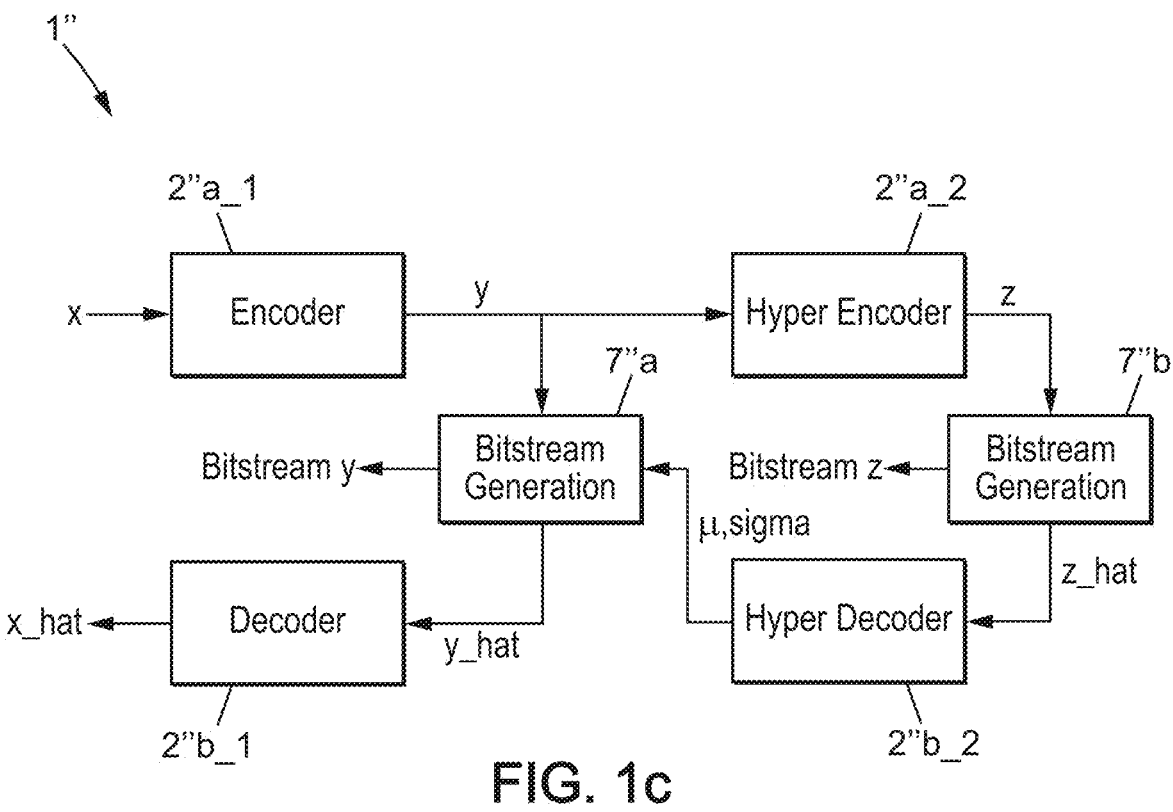
FIG. 1c is a block diagram illustrating an exemplary end-to-end image compression system on which the proposed methods may be implemented in accordance with one or more embodiments.

FIG. 1*c* illustrates in further details an exemplary end-to-end image compression system 1" that may be used in one or more embodiments of the present subject disclosure.

The system 1" comprises an encoder 2"*a*_1 configured for transforming input image data x into a compact latent representation y, with a reduced dimension. In order to transmit y, entropy coding is necessary. To do so, an hyper encoder/decoder subsystem comprising a hyper encoder 2"*a*_2 and a hyper decoder 2"*b*_2 is configured to estimate the probability distribution of the latent representation. Specifically, the hyper encoder 2"*a*_2 transforms the latent representation y into a representation z, which is transmitted in the form of a bitstream z generated by a second bitstream generation subsystem 7"*b*. The bitstream generation subsystem 7"*b* also transmits the representation z to a hyper decoder 2"*b*_2 (through a z_hat input). Upon receiving the representation z (input z_hat), the hyper decoder 2"*b*_2 decodes it in order to estimate parameters μ and sigma of a Laplace distribution. Transmitting y is then possible as a bitstream y generated by a first bitstream generation subsystem 7"*a*. The decoder 2"*b*_1 is configured for reconstructing the input x_hat based on the bitstream of y (in the form of a y_hat input provided to the decoder).

The computing platform used for running the ML algorithm subsystem (2) may have computational resources that are not sufficient for image compression of high-resolution images (e.g. 4K images) using the deep learning model of the ML algorithm subsystem (2).

This may lead to various computational resource limitation issues, such as for instance memory overflow of a Graphic Processor Unit (GPU), being encountered when encoding 4k images using a deep learning-based image compression system such as the system (1).

A high-resolution image to be encoded by a deep learning-based image compression system such as the system (1) may therefore be first divided into a plurality of smaller pixel blocks (sometimes referred to as "patches"), in order to use the deep learning-based image compression system to encode smaller sized patches instead of the original image at once.

Dividing an input image into smaller patches also advantageously allows encoding several parts of the input image in parallel using parallel computing, and also accessing one part of the image without decoding the entire input image.

Figure 2A:
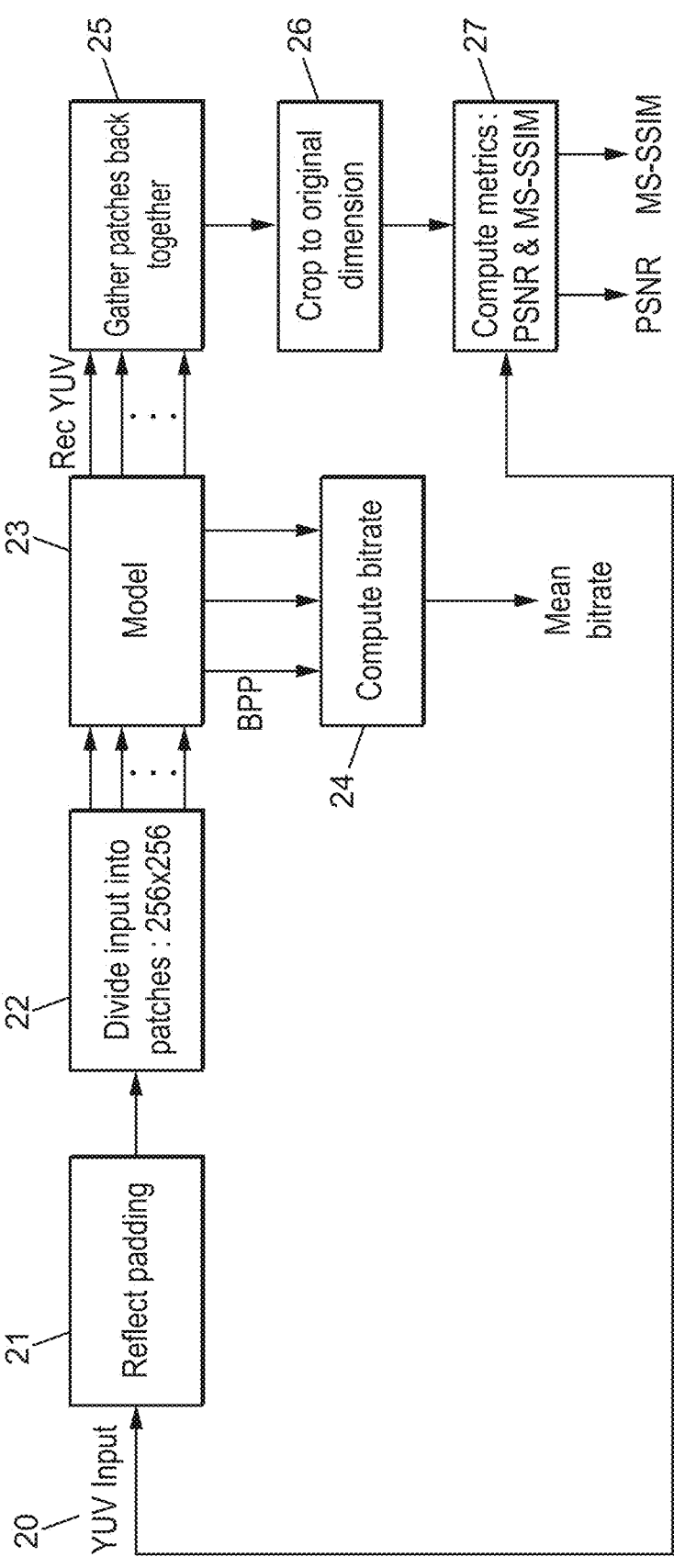
FIG. 2a is a flowchart that illustrates operations of an exemplary method to encode an image using patches.

FIG. 2*a* is a flowchart that illustrates operations of an exemplary method to encode an image using patches.

Shown on FIG. 2*a* is input image data (original image "YUV input") provided to a "Reflect padding" function 21 which adapts if necessary the dimension of the input image data to a multiple of a predetermined patch size (e.g. 256×256 pixels). For example, in one or more embodiments, reflect padding may be applied to an input image "YUV input" in order to make its size divisible by a predetermined M×N patch size (e.g. 256×256).

The adapted input image data is divided into patches of the predetermined patch size by function 22, which generates a plurality of patches.

The patches are fed to an end-to-end deep learning image compression function 23 which produces reconstructed patches ("rec yuv") based on the patches received as input data.

Function 23 further generates "bits per pixel" ("BPP") data for each encoded patch which represents the number of bits required to encode the patch to a entropy function 24, which computes an mean bitrate for encoding the patches based on the bpp data received as input data.

The reconstructed patches are fed to a reconstruction function 25, which gathers the reconstructed patches back together and generates a reconstructed adapted image.

The reconstructed adapted image is input to a crop function 26 which crops the reconstructed adapted image into a reconstructed image ("reconstructed image data") of the same dimension as the original image ("YUV input").

The input image data (original image "YUV input") and the reconstructed image data (reconstructed image) are fed to a metric computation function 27, which computes various image compression performance metrics, such as a peak signal-to-noise ratio (PSNR) metric and a MS-SSIM metric, based on the input image data and the reconstructed image data.

However, visual artefacts can be observed in an image reconstructed from encoded patches.

Figure 2B:
FIG. 2b is an exemplary image on which the block effect is illustrated.

Examples of such artefacts are shown on FIG. 2b, on which a so-called "block effect" can be seen at edges of the patches used for encoding the image.

Using an end-to-end deep learning-based image compression system to encode an image, which requires for some images dividing the image into smaller patches, therefore may generate block effect "visual artefacts" in the reconstructed image. The block effect can advantageously be mitigated thanks to using embodiments of the present subject disclosure.

Figure 3A:
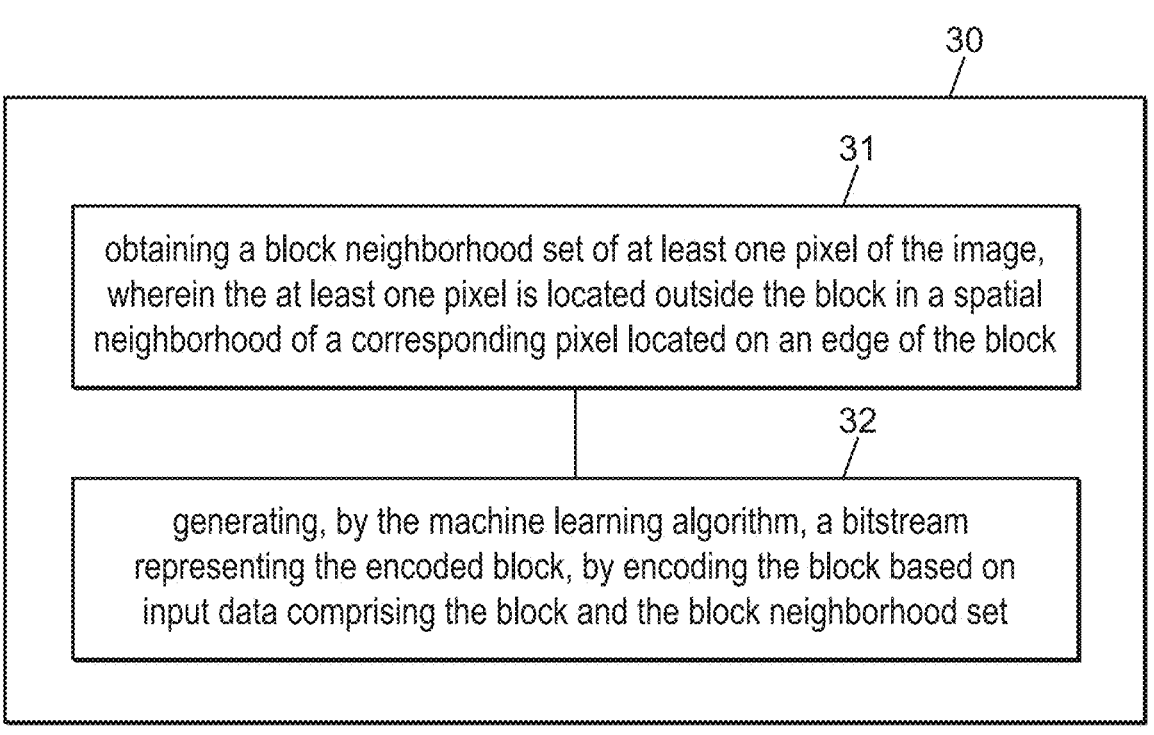
FIG. 3a is a block diagram illustrating an exemplary image processing method in accordance with one or more embodiments.

FIG. 3a is a block diagram illustrating an exemplary image encoding method 30 using a machine learning algorithm during an inference phase thereof in accordance with one or more embodiments.

As discussed above, an input image to be encoded using a machine learning algorithm may be divided into a plurality of pixel blocks (also called patches).

One or more of the pixel blocks may then be input to a computing platform comprising a processor configured for implementing the machine learning algorithm for encoding or compression.

According to one or more embodiments of the present subject disclosure, the encoding of the machine learning algorithm may be improved in order to mitigate the block effect by obtaining 31, for a block of the pixel blocks, a block neighborhood set of at least one pixel of the image, wherein the at least one pixel is located outside the block in a spatial neighborhood of a corresponding pixel located on an edge of the block.

The encoding of the block by the machine learning algorithm may be improved by providing to the machine learning algorithm input data comprising the block neighborhood set in addition to the block. The machine learning algorithm may then generate 32 a bitstream representing the encoded block, that is, corresponding to an encoded representation of the block, by encoding the block based on input data comprising the block and the block neighborhood set. The block effect can advantageously be mitigated thanks to using data of the block neighborhood set for encoding data of the block.

In one or more embodiments, data of the block may be determined by dividing the image, and data of the block neighborhood set may be determined based on data of the image, in particular pixels of the image surrounding the block.

Figure 3B:
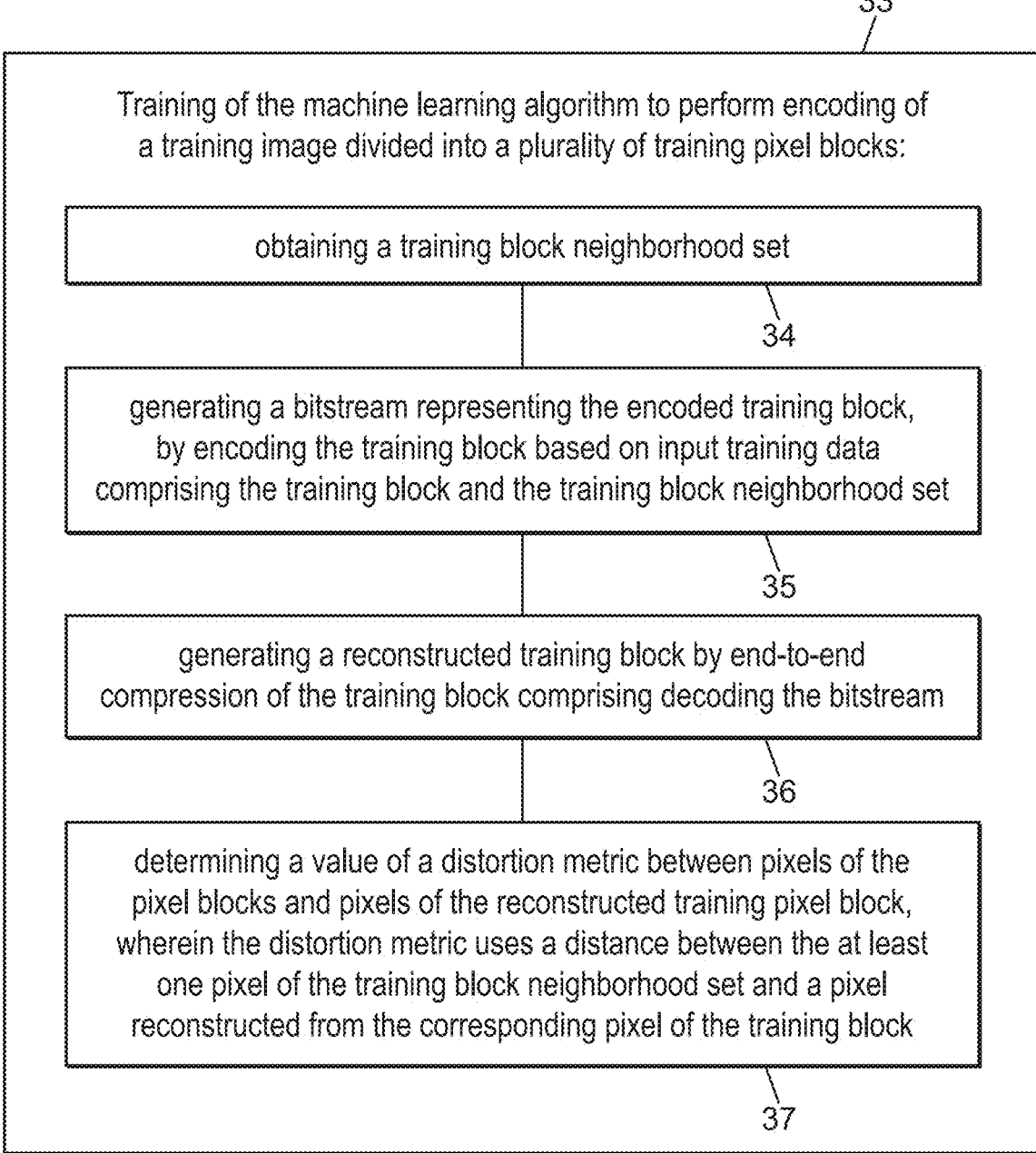
FIG. 3b is a block diagram illustrating an exemplary image processing method in accordance with one or more embodiments.

FIG. 3b is a block diagram illustrating an exemplary image encoding method 33 using a machine learning algorithm during a training phase thereof in accordance with one or more embodiments.

As discussed above, the training of the machine learning algorithm may in some embodiments use one or more training input images to be encoded using the machine learning algorithm configurable for performing end-to-end image compression, which may be divided into a plurality of training pixel blocks (also called patches). The training of the machine learning algorithm may include training for encoding patches according to embodiments of the present subject disclosure.

One or more of the training pixel blocks may then be input to a computing platform comprising a processor configured for implementing the machine learning algorithm for encoding or compression.

According to one or more embodiments of the present subject disclosure the training of the machine learning algorithm for encoding a block may be improved in order to mitigate the block effect by obtaining 34, for a training block of the training pixel blocks, a training block neighborhood set of at least one pixel of the training image, wherein the at least one pixel is located outside the training block in a spatial neighborhood of a corresponding pixel located on an edge of the training pixel block.

In some embodiments, the machine learning algorithm using a model for performing end-to-end compression may be used during training, by generating not only a bitstream corresponding to an encoded representation of the training block, but also a reconstructed training block by decoding the bitstream. In some embodiments, the reconstructed training block may be of the same size as the training block.

In one or more embodiments, the machine learning algorithm may generate 35 a bitstream representing the encoded training block by encoding the training block based on input training data comprising the training block and the training block neighborhood set. The machine learning algorithm may further generate 36 a reconstructed training block (of the same size of the training block) by end-to-end compression of the training block comprising decoding the bitstream.

In one or more embodiments, data of the training block neighborhood set may be used by determining 37 a value of a distortion metric between pixels of the pixel blocks and reconstructed pixels of the reconstructed training pixel block, with the distortion metric that may use a distance between the at least one pixel of the training block neighborhood set and a pixel reconstructed from the corresponding pixel of the training block.

In one or more embodiments, the training block neighborhood set may comprise a plurality of pixels respectively co-located outside the training block with respective pixels reconstructed from corresponding pixels located on respective edges of the training block, in which case the distortion metric may use respective distances between pixels of the plurality of pixels and respectively corresponding pixels of the training block.

Exemplary embodiments of determination of the proposed distortion metric are provided in the following.

Figure 4A:
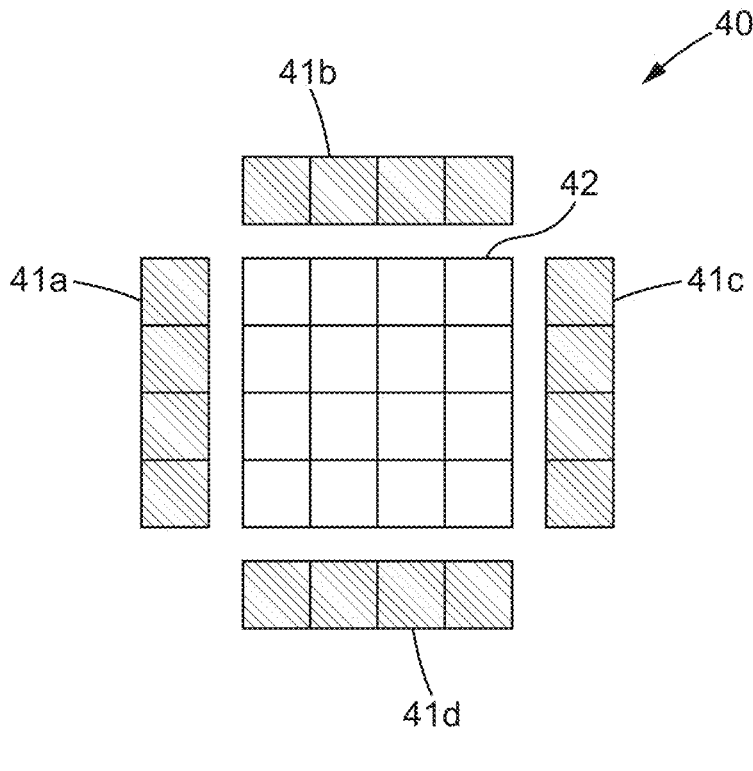
FIG. 4a illustrates an exemplary neighborhood set of pixels of an exemplary pixel block in accordance with one or more embodiments.

An exemplary block neighborhood set is illustrated by FIG. 4a for an exemplary 4×4 pixel block.

Depending on the embodiment, the block neighborhood set may comprise one or more pixels of the image that are not pixels of the pixel block, while respectively corresponding to a pixel located on an edge of the pixel block.

In some embodiments, the block neighborhood set may comprise one or more pixels that are located in a spatial neighborhood of their respectively corresponding pixel located on an edge of the pixel block. In some embodiments, the block neighborhood set may comprise a plurality of pixels respectively co-located outside the block in respective spatial neighborhoods of corresponding pixels located on respective edges of the block.

In some embodiments, the block neighborhood set may comprise a plurality of pixels that respectively correspond to pixels of the pixel block located on different edges of the pixel block (for example, for a rectangular shaped pixel block, the left edge, the top edge, the right edge, and/or the bottom edge).

In some embodiments, the block neighborhood set may comprise one or more pixels of the image, each of which being located in the image outside the block and in a spatial neighborhood of their corresponding pixel of the block.

In one or more embodiments, the size and/or shape of the block neighborhood set may be predefined, for example based on a size and/or shape of the pixel block.

In one or more embodiments, the spatial neighborhood of a pixel of the block (e.g. a pixel of an edge of the block) may be defined through a predefined neighborhood threshold Thres_Neighbor, and to pixels p1 and p2 may be considered located in a spatial neighborhood of each other if a distance between p1 and p2 is less than the neighborhood threshold Thres_Neighbor. For example, for two pixels $p1(x_1; y_1)$ and $p2(x_2; y_2)$ with coordinates in the block represented by a pixel matrix, the two pixels p1 and p2 with may be considered located in a spatial neighborhood of each other if $\sqrt{(x_2-x_1)^2+(y_2-y_1)^2} \leq$ Thres_Neighbor.

In one or more embodiments, the training of the machine learning algorithm may advantageously use a value of a distortion metric between pixels of the training pixel block and reconstructed pixels of a reconstructed training pixel block output by the machine learning algorithm through coding and decoding the pixel block, which is determined for the training block during training. In some embodiments, the reconstructed training pixel block may be of the same size as the training pixel block.

In some embodiments, data corresponding to pixels of the spatial neighborhood set of the training block may be extracted, together with data corresponding to pixels of the training block, from the data set used for training the machine learning algorithm, and may be fed as input training data to the machine learning algorithm for its training for encoding the training block.

In some embodiments, training data used for training the machine learning algorithm to encode the training pixel block of the image may therefore comprise data corresponding to the neighborhood set of pixels of the training pixel block in addition to data corresponding to the training pixel block.

In one or more embodiments, the distortion metric may use a distance between the at least one pixel of the training block neighborhood set and a pixel reconstructed from the corresponding pixel of the training pixel block.

Depending on the embodiment, the distance used for determination of the distortion metric may be of any suitable type, such as, for example, a MSE distance or a MS-SSIM distance.

For example, for a pixel $p(x; y)$ of the training pixel block which is encoded and reconstructed as $\tilde{p}(x; y)$ through the end-to-end image compression performed by the machine learning algorithm during the training phase, the distortion metric used in some embodiments may use a distance between the reconstructed pixel $\tilde{p}(x; y)$ and a corresponding pixel of the training block neighborhood set.

Specifically, in some embodiments, a distortion metric that is advantageously used for training of the machine learning algorithm may be determined based on (for example using, directly or indirectly) a distance between a pixel $\tilde{p}(x; y)$ reconstructed from a pixel $p(x; y)$ of an edge of the training pixel block and a pixel of the training block neighborhood set corresponding to the pixel $p(x; y)$ (therefore a pixel in a spatial neighborhood of the pixel $p(x; y)$).

In some embodiments, the training block neighborhood set may comprise a plurality of pixels corresponding to a neighborhood of several pixel edges of the training pixel block. In some embodiments, a distortion metric that is advantageously used for training of the machine learning algorithm may be determined based on (for example using, directly or indirectly) respective distances between pixels $\tilde{p}(x; y)$ respectively reconstructed from pixels $p(x; y)$ of a respective edge of the training pixel block and respectively corresponding pixels of the training block neighborhood set.

Therefore, advantageously, a distortion that comprises a distortion measurement at one or several edges of the training pixel block may be used according to the present subject disclosure for training the machine learning algorithm. In some embodiments, the machine learning algorithm may be configured through training to minimize a distortion criterion. As a consequence, distortion measured according to the proposed distortion metric may be minimized during training of the machine learning algorithm so that the edges of the training pixel block may be smoothed, which will advantageously mitigate any potential occurrence of the block effect and consequential visual artefacts on the reconstructed image, including when the encoding acquired through training of the machine learning algorithm will be used for encoding an image block during the inference phase of the machine learning algorithm.

Referring back to FIGS. 1*a* and 1*b*, as discussed above with respect to the inference phase, high-resolution images (e.g. 4K images) to be encoded using the ML algorithm subsystem (2) may be divided into pixel blocks, also typically referred to as "patches," in order to avoid issues related to available computational resources needed for encoding the images with predefined performances. In some embodiments, the training of the ML algorithm subsystem (2) may also use high resolution images that are divided into patches, so that the model may be also trained on smaller patches.

For example, in some embodiments, image data patches of predefined sizes (e.g. 256×256 pixels) may be randomly picked from a training data set, in order to perform the training of the ML algorithm subsystem (2) on various patches having a large variety of intrinsic characteristics.

In some embodiments, the ML algorithm subsystem (2) may learn to encode the various patches selected for training of the ML model through multiple iterations performed to minimize a cost function J (e.g. J=R+λ·D). The proposed method may as a consequence comprise in some embodiments the determining of a value of a rate-distortion cost function J based on the value of the distortion metric. In some embodiments, the rate-distortion cost function may for example be of the form J=R+λ·D, where D is the value of the distortion metric, λ is a Lagrangian parameter, and R is an overall bitrate measurement.

In one or more embodiments, the block effect encountered when using image division into patches (e.g. 256×256 patches) may therefore advantageously be addressed as part of the training of the ML algorithm subsystem (2).

In one or more embodiments, the training of the ML algorithm subsystem (2) may be improved so that the model learns to encode a patch of an image while smoothing the edges of the patch, so that the block effect may be mitigated for the patch.

In one or more embodiments, the encoding of a patch by the ML algorithm subsystem (2) during inference may also be improved by providing in the input data block neighborhood data for the patch in addition to data for the patch, so that the block effect may be mitigated when encoding the patch.

In some embodiments, in inference mode, one or more patches of a predefined size may be extracted from an input image to be encoded, together with block neighborhood sets respectively corresponding to extracted patches.

In some embodiments, in training mode, training patches of a predefined size may also be extracted from a training data set, together with training block neighborhood sets respectively corresponding to extracted training patches.

In some embodiments, for a given patch extracted from an image to be encoded by the ML algorithm operating in inference mode, a corresponding block neighborhood set may comprise one or more pixels of the image that are located outside the patch in a spatial neighborhood of one or more pixels located on one or more edges of the patch.

In some embodiments, for a given training patch of a training image extracted for training the ML algorithm, a corresponding training block neighborhood set may comprise one or more pixels of the training image that are located outside the training patch in a spatial neighborhood of one or more pixels located on one or more edges of the training patch.

Depending on embodiments, different sizes and shapes of block neighborhood sets may be used, and one or more block neighborhood sets may be determined and extracted from the input image for each patch to be encoded by the ML algorithm operating in inference mode.

Depending on embodiments, different sizes and shapes of training block neighborhood sets may be used, and one or more training block neighborhood sets may be determined and extracted from the training data set for each training patch to be encoded by the ML algorithm for purposes of training.

In one or more embodiments, a distortion value that takes into consideration the block effect by taking into consideration the distortion at one or more edges of the patch may advantageously be determined, based on the training block neighborhood set obtained (e.g. extracted) for the training patch.

Advantageously, the block effect that may arise from encoding a given patch may therefore be addressed by using for training of the ML algorithm a distortion value that takes into consideration the distortion at one or more edges of the patch.

As such block effect may be mitigated or even corrected during training using the improved training scheme of the ML algorithm to be used for encoding images according to the present subject disclosure, the block effect may advantageously also be mitigated or even corrected during the inference phase thanks to the improved training of the ML algorithm, by providing in the input data of the machine learning algorithm a neighborhood set in addition to a block to be encoded.

In one or more embodiments, during training of the ML algorithm, a distortion value (sometimes referred to in the present subject disclosure as a "smoothing distortion") between input image data (original patch) and reconstructed image data (reconstructed patch of the same size as the original patch) may be determined that takes into account a distortion between one or more edges of the patch and the corresponding neighborhood in the image (from which the patch was extracted). Reconstructed image data may be generated by an end-to-end compression model such as illustrated by FIGS. 1a, 1b, and 1c. For example, a distortion value may be calculated for training purposes that comprises not only distortion measurements between corresponding pixels of the original patch and of the reconstructed patch, but also between corresponding pixels of the neighborhood of the original patch and the corresponding edge of the reconstructed patch.

In one or more embodiments, the distortion metric used for training the machine learning algorithm may use respective distances between pixels of the training blocks and corresponding reconstructed pixels output by the machine learning algorithm through coding and decoding the pixels of the training block.

For example, for a so-called "original" patch that forms a M×N matrix of pixels p(x, y), wherein x=0, . . . , M−1, y=0, . . . , N−1, and a corresponding reconstructed patch that forms a M×N matrix of pixels p̃(x, y), wherein x=0, . . . , M−1, y=0, . . . , N−1, a distortion between corresponding pixels of the original patch and of the reconstructed patch may be measured as:

$$Ddis = \sum_{y=0}^{N-1} \sum_{x=0}^{M-1} (p(x, y) - \tilde{p}(x, y))^2$$

As indicated above any suitable distortion scheme other than the MSE may be used for calculating the distortion between corresponding pixels of the original patch and of the reconstructed patch.

FIG. 4a shows an exemplary neighborhood set that may be used in one or more embodiments, for example be provided as input data to a ML algorithm operating in training mode or in inference mode.

Shown on FIG. 4a is an exemplary data extended patch 40 that includes a patch 42 (in the example of FIG. 4a of size 4×4) (that may also be referred to as a pixel block) of an image, with its neighborhood set comprising one or more of four neighborhood subsets: a so-called "top neighborhood subset" 41b comprising one or more pixels of a row above the top edge of the patch, a so-called "left neighborhood subset" 41a comprising one or more pixels of a column on the left of the left edge of the patch, a so-called "bottom neighborhood subset" 41d comprising one or more pixels of a row below the bottom edge of the patch, and a so-called "right neighborhood subset" 41c comprising one or more pixels of a column on the right of the right edge of the patch.

The patch 42 may correspond in some embodiments to a training patch when provided as training input data to a ML algorithm operating in training mode.

In one or more embodiments in which the patch 42 is provided as training input data to a ML algorithm operating in training mode, a distortion between pixels of the left neighborhood subset 41a of the original patch 42 and pixels of the corresponding (with respect to spatial neighborhood relation) left edge of the reconstructed patch may be measured as (using the exemplary MSE metric):

$$D_{smooth\_left} = \sum_{y=0}^{N-1} (p(-1, y) - \tilde{p}(0, y))^2$$

In the metric, the pixels of the left neighborhood subset of the patch (N pixels p(−1, y), with y=0, . . . , N−1) are used (and therefore taken into account) for determining a distortion with the edge pixels of the left edge of the patch (N pixels p̃(0, y) with y=0, . . . , N−1).

In one or more embodiments, a distortion between pixels of the top neighborhood subset 41b of the original patch 42 and pixels of the corresponding (with respect to spatial neighborhood relation) top edge of the reconstructed patch may be measured as (using the exemplary MSE metric):

$$D_{smooth\_top} = \sum_{x=0}^{M-1} (p(x, -1) - \tilde{p}(x, 0))^2$$

In the metric, the pixels of the top neighborhood of the patch (M pixels $p(x, -1)$, with $x=0, \ldots, M-1$) are used (and therefore taken into account) for determining a distortion with the edge pixels of the top edge of the patch (M pixels $\tilde{p}(x, 0)$ with $x=0, \ldots, M-1$).

In one or more embodiments, a distortion between pixels of the right neighborhood subset 41c of the original patch 42 and pixels of the corresponding (with respect to spatial neighborhood relation) right edge of the reconstructed patch may be measured as (using the exemplary MSE metric):

$$D_{smooth\_right} = \sum_{y=0}^{N-1} (p(N, y) - \tilde{p}(N-1, y))^2$$

In the metric, the pixels of the right neighborhood subset of the patch (N pixels $p(N, y)$, with $y=0, \ldots, N-1$) are used (and therefore taken into account) for determining a distortion with the edge pixels of the right edge of the patch (N pixels $\tilde{p}(N-1, y)$ with $y=0, \ldots, N-1$).

In one or more embodiments, a distortion between pixels of the bottom neighborhood subset 41d of the original patch 42 and pixels of the corresponding (with respect to spatial neighborhood relation) bottom edge of the reconstructed patch may be measured as (using the exemplary MSE metric):

$$D_{smooth\_bottom} = \sum_{x=0}^{M-1} (p(x, M) - \tilde{p}(x, M-1))^2$$

In the metric, the pixels of the bottom neighborhood of the patch (M pixels $p(x, M)$, with $x=0, \ldots, M-1$) are used (and therefore taken into account) for determining a distortion with the edge pixels of the bottom edge of the patch (M pixels $\tilde{p}(x, M-1)$ with $x=0, \ldots, M-1$).

Depending on the embodiment, one or more smoothing distortions (e.g. respectively corresponding to different edges of the patch) may be used for determining a distortion value D that is used for training a machine learning algorithm to encode M×N pixels training patches. For example, one or more of the exemplary MSE smoothing distortions $D_{smooth\_left}$, $D_{smooth\_right}$, $D_{smooth\_top}$, and $D_{smooth\_bottom}$ may be used for determining a distortion value D which is used for training a machine learning algorithm to encode M×N pixels training patches.

In some embodiments, the distortion value D used for training the machine learning algorithm to encode M×N pixels training patches may be determined based on a weighted combination of a distortion $D_{dis}$ between corresponding pixels of the original patch and of the reconstructed patch (for example calculated according to the above example MSE distortion $D_{dis}$), and one or more smoothing distortions, such as for example one or more of the above exemplary MSE smoothing distortions $D_{smooth\_left}$, $D_{smooth\_right}$, $D_{smooth\_top}$, and $D_{smooth\_bottom}$.

For example, in some embodiments, the distortion value D1 used for training the machine learning algorithm to encode M×N pixels training patches may be determined based on the following weighted combination:

$$D1 = \alpha \cdot D_{dis} +$$
$$\left(\beta_1 \cdot D_{smooth_{left}} + \beta_2 \cdot D_{smooth_{right}} + \beta_3 \cdot D_{smooth_{bottom}} + \beta_4 \cdot D_{smooth_{top}}\right)$$

where $\alpha$, $\beta_1$, $\beta_2$, $\beta_3$, and $\beta_4$ are real number weights that may, in some embodiments, be predefined. For example, in some embodiments, the weight $\alpha$ may be set to 1, and the weights $\beta_1$, $\beta_2$, $\beta_3$, and $\beta_4$ may each be set to $$\frac{M \times N}{(2 \times (M+N))},$$

where M×N is the size of the block.

For example, in some embodiments, the MSE distortion value D2 used for training the machine learning algorithm to encode M×N pixels training patches may be determined based on the following weighted combination;

$$D2 = \alpha \cdot D_{dis} +$$
$$\left(\beta_1 \cdot D_{smooth_{left}} + \beta_2 \cdot D_{smooth_{right}} + \beta_3 \cdot D_{smooth_{bottom}} + \beta_4 \cdot D_{smooth_{top}}\right)$$

where:

$$Ddis = \sum_{y=0}^{N-1} \sum_{x=0}^{M-1} (p(x, y) - \tilde{p}(x, y))^2$$

$$D_{smooth\_left} = \sum_{y=0}^{N-1} (p(-1, y) - \tilde{p}(0, y))^2$$

$$D_{smooth\_top} = \sum_{x=0}^{M-1} (p(x, -1) - \tilde{p}(x, 0))^2$$

$$D_{smooth\_right} = \sum_{y=0}^{N-1} (p(N, y) - \tilde{p}(N-1, y))^2$$

$$D_{smooth\_bottom} = \sum_{x=0}^{M-1} (p(x, M) - \tilde{p}(x, M-1))^2$$

and where $\alpha$, $\beta_1$, $\beta_2$, $\beta_3$, and $\beta_4$ are real number weights that may, in some embodiments, be predefined. For example, in some embodiments, the weight $\alpha$ may be set to 1, and the weights $\beta_1$, $\beta_2$, $\beta_3$, and $\beta_4$ may each be set to $$\frac{M \times N}{(2 \times (M+N))},$$

where M×N is the size of the block.

As another example, in some embodiments, the distortion value D3 used for training the machine learning algorithm to encode M×N pixels training patches may be determined based on the following weighted combination:

$$D3 = \alpha \cdot D_{dis} + \beta \cdot \left[D_{smooth_{left}} + D_{smooth_{right}} + D_{smooth_{bottom}} + D_{smooth_{top}}\right]$$

where $\alpha$ and $\beta$ are real number weights that may, in some embodiments, be predefined. For example, in some embodiments, the weight $\alpha$ may be set to 1, and the weight $\beta$ may be set to $$\frac{M \times N}{(2 \times (M+N))},$$

where M×N is the size of the block.

For example, in some embodiments, the MSE distortion value D4 used for training the machine learning algorithm to encode M×N pixels training patches may be determined based on the following weighted combination;

$$D4 = \alpha \cdot D_{dis} + \beta \cdot \left[ D_{smooth_{left}} + D_{smooth_{right}} + D_{smooth_{bottom}} + D_{smooth_{top}} \right]$$

where:

$$Ddis = \sum_{y=0}^{N-1} \sum_{x=0}^{M-1} (p(x, y) - \check{p}(x, y))^2$$

$$D_{smooth\_left} = \sum_{y=0}^{N-1} (p(-1, y) - \check{p}(0, y))^2$$

$$D_{smooth\_top} = \sum_{x=0}^{M-1} (p(x, -1) - \check{p}(x, 0))^2$$

$$D_{smooth\_right} = \sum_{y=0}^{N-1} (p(N, y) - \check{p}(N-1, y))^2$$

$$D_{smooth\_bottom} = \sum_{x=0}^{M-1} (p(x, M) - \check{p}(x, M-1))^2$$

and where $\alpha$ and $\beta$ are real number weights that may, in some embodiments, be predefined. For example, in some embodiments, the weight $\alpha$ may be set to 1, and the weight $\beta$ may be set to $$\frac{M \times N}{(2 \times (M+N))},$$

where M×N is the size of the block.

In one or more embodiments, the training block neighborhood set may comprise a plurality of pixels respectively co-located outside the training block in respective spatial neighborhoods of corresponding pixels located on respective edges of the training block, in which case the distortion metric may use respective distances between pixels of the plurality of pixels and respectively corresponding pixels of the training block.

Figure 4B:
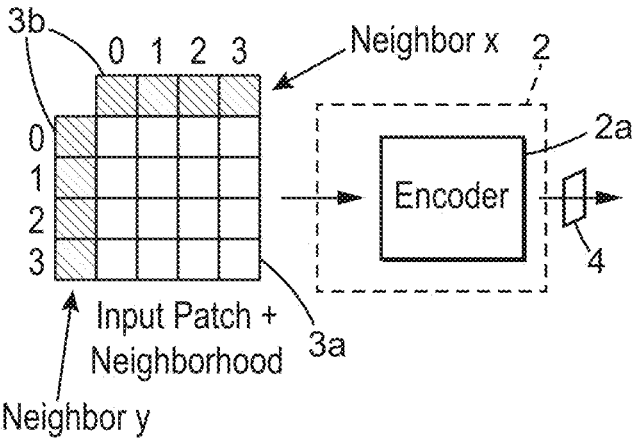
FIG. 4b is a block diagram illustrating an exemplary image compression system on which the proposed methods may be implemented in accordance with one or more embodiments.

FIG. 4b illustrates an exemplary image compression system that may be used in one or more embodiments of the present subject disclosure in the context of a ML algorithm used for encoding image patches operating in inference mode.

The image compression system may comprise a computing platform configured for running an unsupervised machine learning (ML) algorithm, such as, for example, an autoencoder neural network, on a computing platform subsystem. The ML algorithm subsystem (2) may comprise an image forward encoder subsystem (2a) configured for generating a compressed representation (4) of input image data (3a' and 3b) provided to the forward encoder subsystem (2a).

As shown in FIG. 4b, the ML algorithm subsystem (2) may be configured to generate, in an inference mode, an encoded image patch (4) by encoding an input image patch (3a') using also the input patch neighborhood set (3b') provided in the input image data. In the example illustrated on FIG. 4b, the input patch neighborhood set (3b) comprises a "neighbor x" subset and a "neighbor y" subset.

Figure 4C:
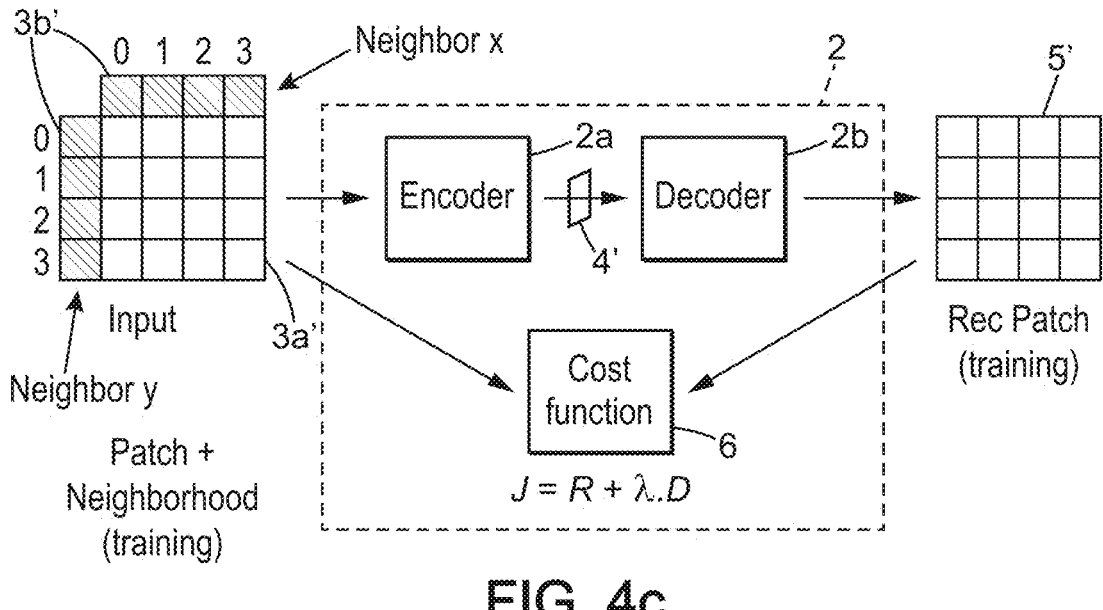
FIG. 4c is a block diagram illustrating an exemplary end-to-end image compression system on which the proposed methods may be implemented in accordance with one or more embodiments.

FIG. 4c illustrates an exemplary end-to-end image compression system that may be used in one or more embodiments of the present subject disclosure in the context of a training phase of a ML algorithm used for encoding image patches.

The image compression system of FIG. 4c corresponds to that of FIG. 1b, and FIG. 4c further shows input training data provided during training to the ML algorithm subsystem (2) that comprises a training block 3a' and a training block neighborhood set 3b' determined (or, depending on the embodiment, extracted from image data) for the training block 3a'. In the example illustrated on FIG. 4c, the input patch neighborhood set (3b) comprises a "neighbor x" subset and a "neighbor y" subset.

As described with respect to FIG. 1b, the ML algorithm subsystem (2) shown on FIG. 4b may in some embodiments be trained using as input data a training block 3a' and corresponding neighborhood set 3b' extracted from a training data set specifically designed for improving performances of the training. In some embodiments, an optimization subsystem (6) of the ML algorithm subsystem (2) may be configured for rate-distortion optimization, for example through minimization of a cost function J.

As described with respect to FIG. 1b, in some embodiments, images of the input training data set may be processed during respective iterations of a training loop.

In some embodiments, the cost function may comprise a distortion metric D that estimates a distortion between the original training block 3a', and the reconstructed block obtained from the reconstructed training block (5').

In some embodiments, the cost function may comprise a rate-distortion cost function that estimates an end-to-end rate-distortion performance, a value of which may be determined based on the value of the distortion metric D. The optimization subsystem (6) may be configured to jointly optimize the rate-distortion performance using the cost function, for example using a Lagrangian optimization scheme.

In one or more embodiments, the proposed method may further comprise: obtaining an original block neighborhood set, and one or more pixels of the block neighborhood set may be determined by processing (e.g. filtering) one or more pixels of the original block neighborhood set.

In one or more embodiments, the proposed method may further comprise, in the context of the machine learning operating in inference mode: obtaining a block extended neighborhood set of a plurality of pixels located outside the block in a spatial neighborhood of respectively corresponding pixels located on one or more edges of the block; and determining the block neighborhood set based on a filtering of pixels of the block extended neighborhood set.

In one or more embodiments, the proposed method may further comprise, in the context of the machine learning operating in training mode: obtaining a training block extended neighborhood set of a plurality of pixels located outside a training block in a spatial neighborhood of respectively corresponding pixels located on one or more edges of the training pixel block, and determining the training block neighborhood set based on a filtering of pixels of the training block extended neighborhood set.

Depending on the embodiment, the filtering of the pixels may for example use one or more of a Mean filter and a Gaussian filter.

Figure 5A:
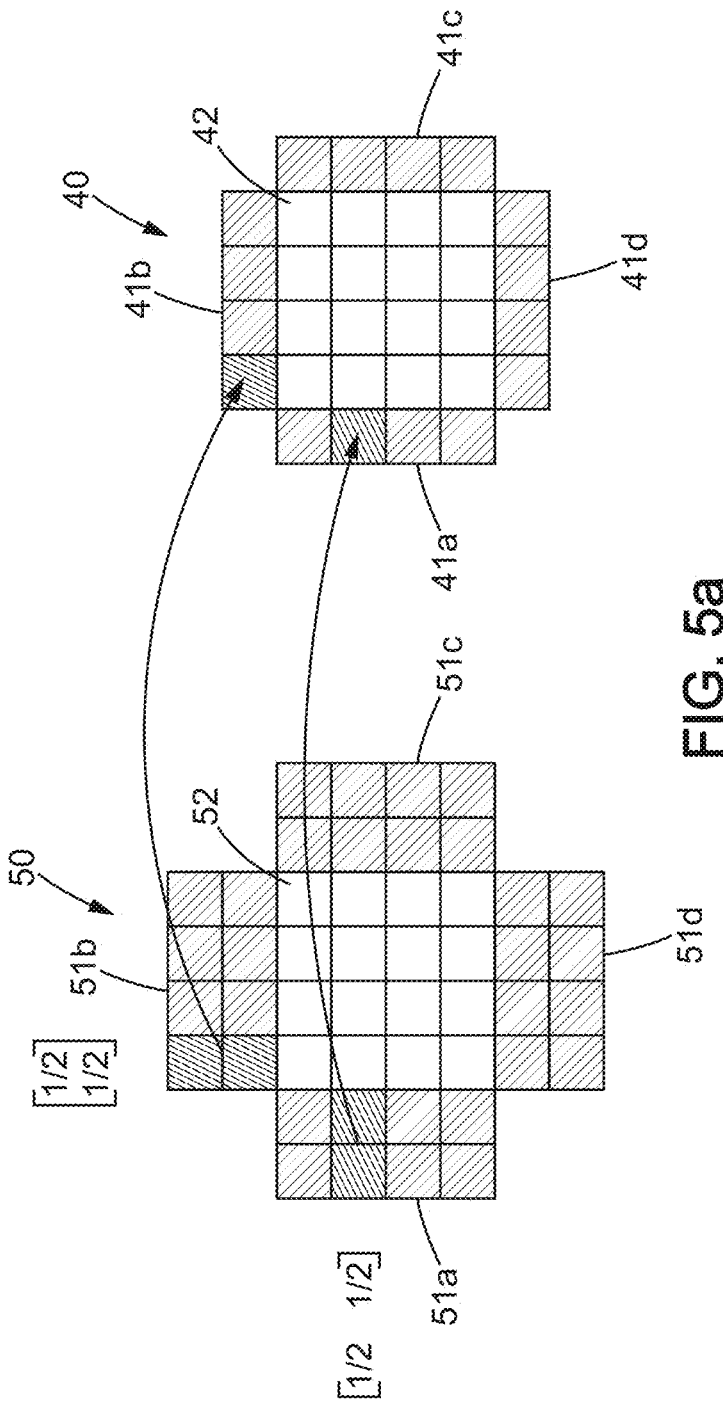
FIGS. 5a, 5b, and 5c show exemplary neighborhood sets that may be used in one or more embodiments.
Figure 5B:
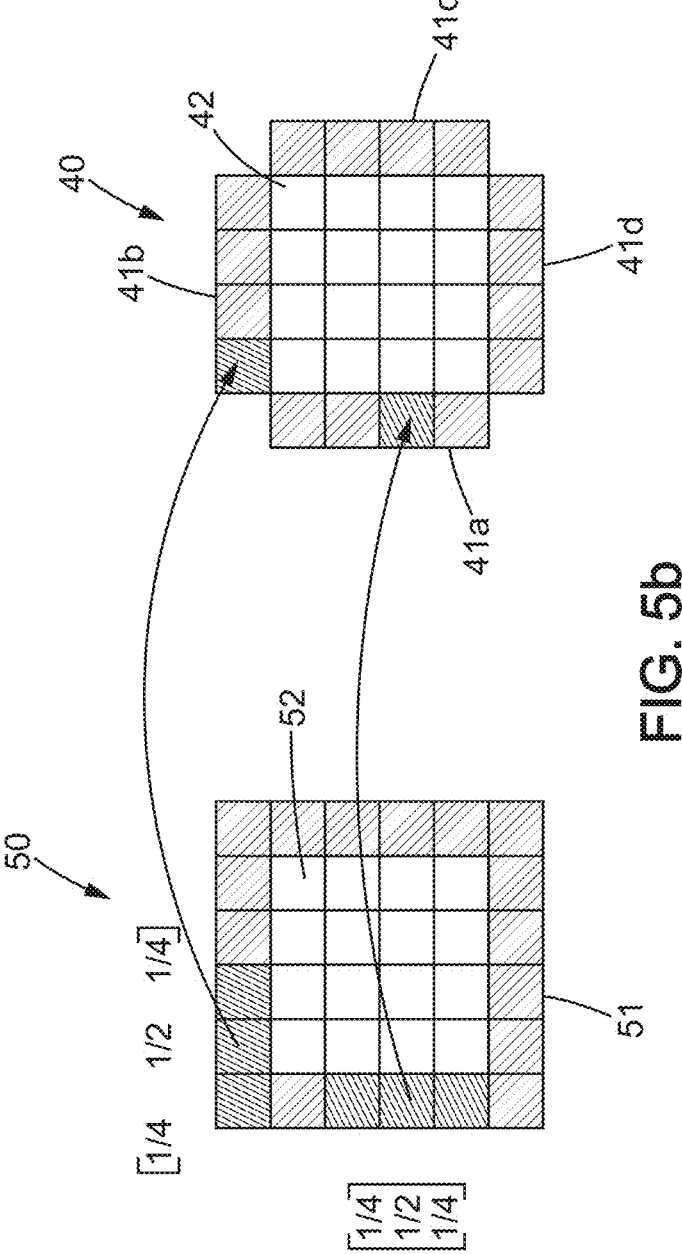
Figure 5C:
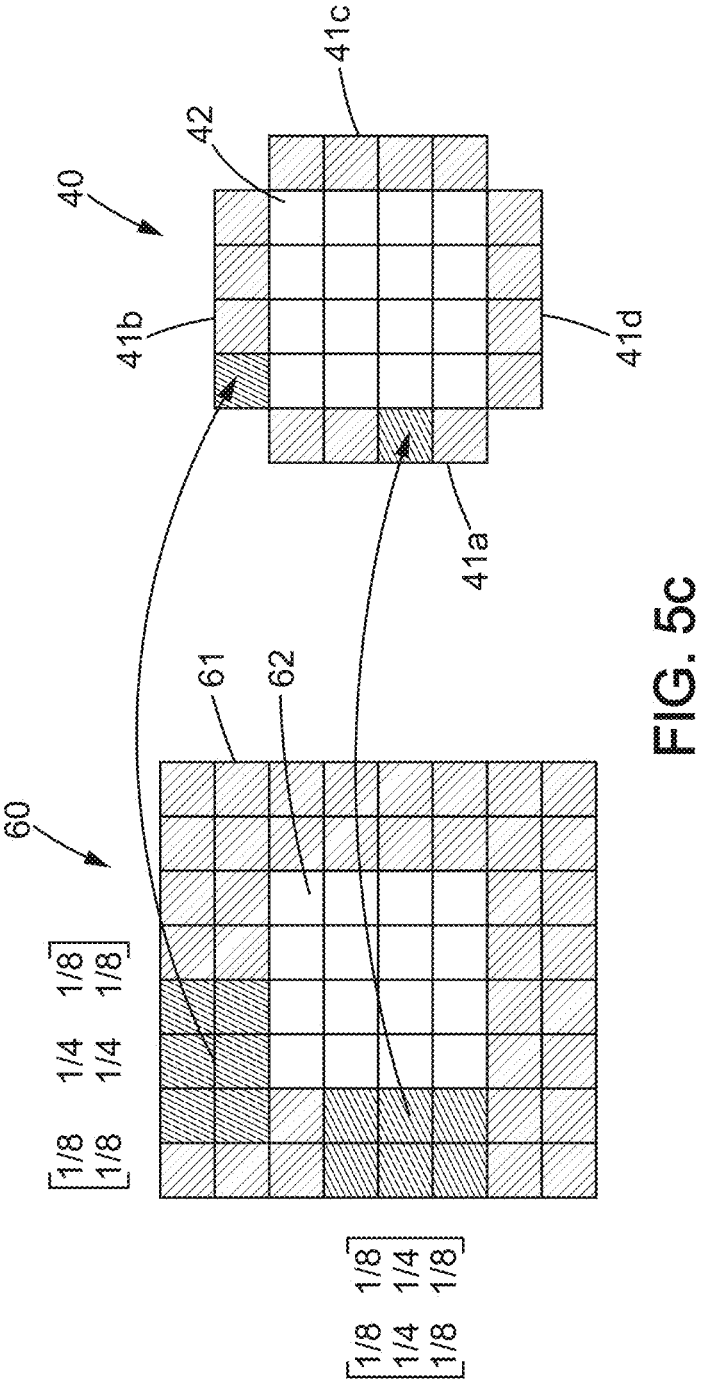

Shown on FIGS. 5a, 5b, and 5c are examples of block neighborhood set comprising one or more pixels generated from filtering pixels of an original block neighborhood set (that may also be referred to as a block extended neighborhood set).

FIG. 5a shows another exemplary neighborhood set that may be used in one or more embodiments.

Shown on FIG. 5a is an exemplary extended patch 50 that includes a patch 52 (in the example illustrated on FIG. 5a of size 4×4) (that may also be referred to as a pixel block) of an image, with an extended neighborhood set (also referred to as an "original neighborhood set" in the following) comprising one or more of four extended neighborhood subsets: a so-called "top extended neighborhood subset" 51b comprising pixels of two rows above the top edge of the patch, a so-called "left extended neighborhood subset" 51a comprising pixels of two columns on the left of the left edge of the patch, a so-called "bottom extended neighborhood subset" 51d comprising pixels of two rows below the bottom edge of the patch, and a so-called "right extended neighborhood subset" 51c comprising pixels of two columns on the right of the right edge of the patch.

In one or more embodiments, filtering can be applied to pixels of one or more of the four extended neighborhood subsets in order to generate a neighborhood set comprising one or more of four neighborhood subsets: a so-called "top neighborhood subset" 41b comprising one or more pixels of a row above the top edge of the patch, a so-called "left neighborhood subset" 41a comprising one or more pixels of a column on the left of the left edge of the patch, a so-called "bottom neighborhood subset" 41d comprising one or more pixels of a row below the bottom edge of the patch, and a so-called "right neighborhood subset" 41c comprising one or more pixels of a column on the right of the right edge of the patch.

Therefore FIG. 5a illustrates an example of a block neighborhood set comprising one or more pixels generated from filtering pixels of an original block neighborhood set.

For example, in some embodiments, pixels of the two rows of the top extended neighborhood subset 51b may be filtered to generate one or more pixels of the top neighborhood subset 41b (the top neighborhood subset 41b comprising one or more pixels on one row), pixels of the two rows of the bottom extended neighborhood subset 51d may be filtered to generate one or more pixels of the bottom neighborhood subset 41d (the bottom neighborhood subset 41d comprising one or more pixels on one row), pixels of the two columns of the left extended neighborhood subset 51 a may be filtered to generate one or more pixels of the left neighborhood subset 41a (the left neighborhood subset 41a comprising one or more pixels on one column), and/or pixels of the two columns of the right extended neighborhood subset 51c may be filtered to generate one or more pixels of the right neighborhood subset 41c (the right neighborhood subset 41c comprising one or more pixels on one column).

Using a block neighborhood set comprising one or more neighborhood subsets generated based on one or more extended neighborhood subsets advantageously allows using a block neighborhood set comprised of pixels that reflect a deeper neighborhood of the block (or patch).

Depending on the embodiment, any suitable type of filter, such as for example a Mean filter or a Gaussian filter, can be used for generating the block neighborhood set to be used for training the machine learning algorithm.

For example, a mean filter can be used to obtain one or more filtered neighbors (pixels of the block neighborhood set) by averaging selected pixels of the extended neighborhood set.

For example, as illustrated on FIG. 5a, a mean filter can be used to obtain each filtered neighbor n by averaging pixels $p_n$ of the extended neighborhood set. For example, in one or more embodiments, a mean filter of size L (L=2 on FIG. 5a) may be used to calculate the pixels n of one or more of the neighborhood sets.

For example, as illustrated on FIG. 5a, in one or more embodiments, a mean filter of size L (L=2 on FIG. 5a) may be used to calculate the pixels n of the top neighborhood set according to the following formula:

$$n(x, -1) = \frac{1}{L} \cdot \sum_{y=-L}^{-1} p_n(x, y)$$

As another example, as illustrated on FIG. 5a, in one or more embodiments, a mean filter of size L (L=2 on FIG. 5a) may be used to calculate the pixels n of the left neighborhood set according to the following formula:

$$n(-1, y) = \frac{1}{L} \cdot \sum_{x=-L}^{-1} p_n(x, y)$$

Similar operations may be carried out to generate, based respectively on pixels of the right extended neighborhood set 51c and/or of the bottom extended neighborhood set 51d, for example by filtering, the right neighborhood subset 41c and/or the bottom neighborhood subset 41d shown on FIG. 5a.

FIG. 5b shows another exemplary neighborhood set that may be used in one or more embodiments.

Shown on FIG. 5b is another example of block neighborhood set comprising one or more pixels generated from filtering pixels of an original block neighborhood set.

As illustrated on FIG. 5b, an exemplary training data extended patch 50 may include in one or more embodiments a patch 52 (that may also be referred to as a pixel block) of an image, with an extended neighborhood set 50 (that may also be referred to as an original neighborhood set).

In one or more embodiments, filtering can be applied to one or more sets of pixels of the original neighborhood set 51 in order to generate pixels of a block neighborhood set. For example, as illustrated by FIG. 5b, the block neighborhood set may comprise four neighborhood subsets: a so-called "top neighborhood subset" 41b comprising one or more pixels of a row above the top edge of the patch, a so-called "left neighborhood subset" 41a comprising one or more pixels of a column on the left of the left edge of the patch, a so-called "bottom neighborhood subset" 41d comprising one or more pixels of a row below the bottom edge of the patch, and a so-called "right neighborhood subset" 41c comprising one or more pixels of a column on the right of the right edge of the patch.

For example, in some embodiments, pixels of the top row of the original neighborhood set 51 may be filtered to generate one or more pixels (e.g. a top left pixel on the example illustrated by FIG. 5*b*) of the top neighborhood subset 41*b* (the top neighborhood subset 41*b* comprising one or more pixels on one row), and/or pixels of the left column of the original neighborhood set 50 may be filtered to generate one or more pixels of the left neighborhood subset 41 a (the left neighborhood subset 41*a* comprising one or more pixels on one column). Similar operations may be carried out to generate, based on pixels of the original neighborhood set 51, for example by filtering, the right neighborhood subset 41*c* and/or the bottom neighborhood subset 41*d* shown on FIG. 5*b*.

Depending on the embodiment, any suitable type of filter, such as for example a Mean filter or a Gaussian filter, can be used for generating the block neighborhood set to be used for training the machine learning algorithm.

For example, in one or more embodiments, a mean filter can be used to obtain one or more filtered neighbors (pixels of the block neighborhood set) by averaging selected pixels of the original neighborhood set 50.

For example, in one or more embodiments, a mean filter can be used to obtain each filtered neighbor n by averaging pixels p$_n$ of the original neighborhood set 50.

For example, as illustrated on FIG. 5*b*, in one or more embodiments, a mean filter of size L=3 may be used to compute a weighted average of 3 pixels of the original neighborhood set 50 with weights respectively equal to ¼, ½, and ¼ in order to generate a pixel of one of the neighborhood subsets. As illustrated by FIG. 5*b*, a pixel of the top neighborhood subset 41*b* may be generated by filtering 3 pixels of the top row of the original neighborhood set 50 using a weighted average with weights ¼, ½, and ¼, and a pixel of the left neighborhood subset 41*a* may be generated by filtering 3 pixels of the left column of the original neighborhood set 50 using a weighted average with weights ¼, ½, and ¼.

FIG. 5*c* shows another exemplary neighborhood set that may be used in one or more embodiments.

Shown on FIG. 5*c* is yet another example of block neighborhood set comprising one or more pixels generated from filtering pixels of an original block neighborhood set.

As illustrated on FIG. 5*c*, an exemplary training data extended patch 60 may include in one or more embodiments a patch 62 (that may also be referred to as a pixel block) of an image, with an extended neighborhood set 60 (that may also be referred to as an original neighborhood set).

In one or more embodiments, filtering can be applied to one or more sets of pixels of the original neighborhood set 61 in order to generate pixels of a block neighborhood set. For example, as illustrated by FIG. 5*c*, the block neighborhood set may comprise four neighborhood subsets: a so-called "top neighborhood subset" 41*b* comprising one or more pixels of a row above the top edge of the patch, a so-called "left neighborhood subset" 41*a* comprising one or more pixels of a column on the left of the left edge of the patch, a so-called "bottom neighborhood subset" 41*d* comprising one or more pixels of a row below the bottom edge of the patch, and a so-called "right neighborhood subset" 41*c* comprising one or more pixels of a column on the right of the right edge of the patch.

For example, in some embodiments, pixels of the top two rows of the original neighborhood set 61 may be filtered to generate one or more pixels (a top left pixel on the example illustrated by FIG. 5*c*) of the top neighborhood subset 41*b* (the top neighborhood subset 41*b* comprising one or more pixels on one row), and/or pixels of the two left columns of the original neighborhood subset 60 may be filtered to generate one or more pixels of the left neighborhood subset

41*a* (the left neighborhood subset 41 a comprising one or more pixels on one column). Similar operations may be carried out to generate, based on pixels of the original neighborhood set 61, for example by filtering, the right neighborhood subset 41*c* and/or the bottom neighborhood subset 41*d* shown on FIG. 5*c*.

Depending on the embodiment, any suitable type of filter, such as for example a Mean filter or a Gaussian filter, can be used for generating the block neighborhood set to be used for training the machine learning algorithm.

For example, in one or more embodiments, a mean filter can be used to obtain one or more filtered neighbors (pixels of the block neighborhood set) by averaging selected pixels of the original neighborhood set 60.

For example, in one or more embodiments, a mean filter can be used to obtain each filtered neighbor n by averaging pixels p$_n$ of the original neighborhood set 50.

For example, as illustrated on FIG. 5*c*, in one or more embodiments, a mean filter of size L=6 may be used to compute a weighted average of 6 pixels of the original neighborhood set 60 with weights respectively equal to ⅛, ¼, and ⅛ (for 3 pixels of each of the two top/bottom rows or left/right columns of the original neighborhood set 60) in order to generate a pixel of one of the neighborhood subsets. As illustrated by FIG. 5*b*, a pixel of the top neighborhood subset 41*b* may be generated by filtering 6 pixels of the top two rows of the original neighborhood set 60 using a weighted average with weights ⅛, ¼, and ⅛ (applied to sets of 3 pixels on each row), and a pixel of the left neighborhood subset 41*a* may be generated by filtering 6 pixels of the two left columns of the original neighborhood set 60 using a weighted average with weights ⅛, ¼, and ⅛ (applied to sets of 3 pixels on each column).

Figure 6:
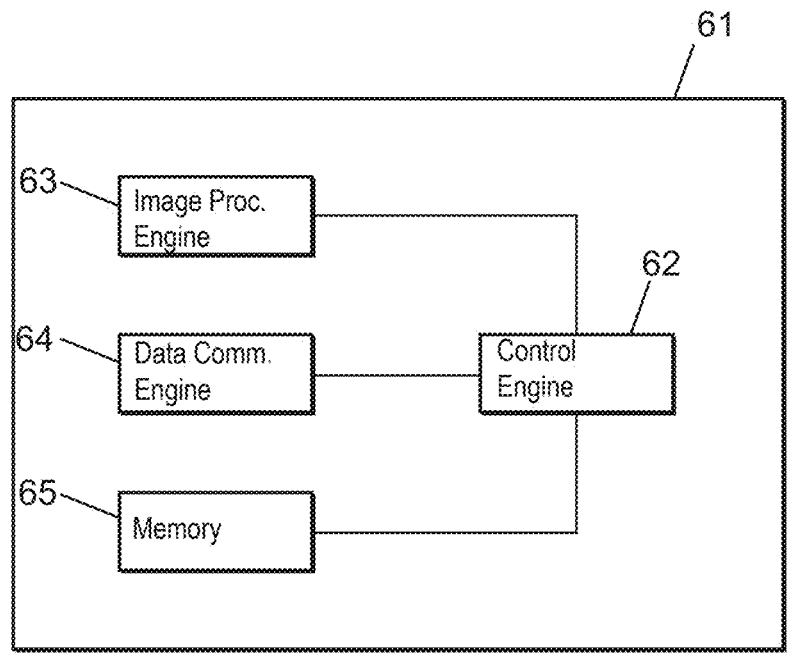
FIG. 6 illustrates an exemplary apparatus according to one or more embodiments.

FIG. 6 illustrates an exemplary image coding apparatus or unit 1 configured to use an image processing feature in accordance with embodiments of the present subject disclosure.

The apparatus 60, which may comprise one or more computers, includes a control engine 62, an image processing engine 63, a data communication engine 64, a memory 65, and a power supply (e.g., a battery, plug-in power supply, etc.) (not represented on the figure).

In the architecture illustrated on FIG. 6, all of the image processing engine 63, data communication engine 64, and memory 65 are operatively coupled with one another through the control engine 62.

In one or more embodiments, the image processing engine 63 may be configured to perform various aspects of embodiments of the proposed method for encoding image data as described herein. In some embodiments, the image processing engine 63 may be incorporated in an image compression engine configured for performing image encoding and/or decoding according to embodiments of the present subject disclosure. In some embodiments, the image processing engine 63 may be configured to implement a machine learning algorithm configurable for performing end-to-end image compression and may further be configured to perform training of the machine learning algorithm to perform end-to-end image compression according to embodiments of the present subject disclosure.

In one embodiment, the data communication engine 64 is configured to receive input image data and output processed image data.

The control engine 62 includes a processor, which may be any suitable microprocessor, microcontroller, Central Processing Unit (CPU), Graphic Processing Unit (GPU), Field Programmable Gate Arrays (FPGA), Application Specific Integrated Circuits (ASIC), Digital Signal Processing chip, and/or state machine, or a combination thereof. According to various embodiments, the control engine 62 can be configured as a multi-processor computer having multiple processors for providing parallel computing. The control engine 62 may also comprise, or may be in communication with, computer storage media, such as, without limitation, the memory 65, capable of storing computer program instructions or software code that, when executed by the processor, causes the processor to perform the elements described herein. In addition, the memory 65 may be any type of data storage computer storage medium, capable of storing a data structure representing a computer network to which the apparatus 61 belongs, coupled to the control engine 62 and operable with the data communication engine 64 and the image processing engine 63 to facilitate management and processing of image and/or video data stored in association therewith.

In embodiments of the present subject disclosure, the apparatus 61 is configured for performing the image processing methods described herein.

It will be appreciated that the apparatus 61 shown and described with reference to FIG. 6 is provided by way of example only. Numerous other architectures, operating environments, and configurations are possible. Other embodiments of the apparatus 61 may include fewer or greater number of components and may incorporate some or all of the functionality described with respect to the apparatus components shown in FIG. 6. Accordingly, although the control engine 62, image processing engine 63, data communication engine 64, and memory 65 are illustrated as part of the apparatus 61, no restrictions are placed on the location and control of components 62, 63, 64, or 65. In particular, in other embodiments, components 62, 63, 64, or 65 may be part of different entities or computing systems.

Embodiments of the proposed method for encoding image data provide several advantages, including the following;

Issues related to computational resources of the computing platform on which end-to-end image compression is performed using a deep learning model are alleviated thanks to mitigating the block effect.

The proposed method offers the flexibility of various parallel computing implementations.

Using the proposed method, one can access to a subpart of an encoded image by only decoding the relevant subpart, which avoids decoding the entire image.

The proposed methods present a computation complexity which is advantageously similar to that of conventional end-to-end image compression systems.

Exemplary embodiments of some aspects of the present subject disclosure are described in the following;

For example, in one or more embodiments, the end-to-end learned codec (end-to-end learned compression model) used for encoding image patches according to embodiments of the present subject disclosure may correspond to an implementation of the model architecture of the type described in details in the article "Learned image compression with discretized Gaussian mixture likelihoods and attention modules", by Z. Cheng, H. Sun, M. Takeuchi, and J. Katto, CVPR 2020, pp. 7936-7945, 2020, which discusses an autoencoder model leveraging the efficiency of residual blocks and attention modules, in addition to using a Gaussian Mixture model as the entropy engine.

In some embodiments, the end-to-end compression model used for encoding patches according to embodiments of the present subject disclosure may be trained on several hundred thousands (e.g. approximately 400,000) samples from the CLIC 2020 Dataset. For training the model, in some embodiments, a M×N (e.g. 256×256) size crop may be randomly extracted from each image of the training set. The model may be trained on a total of 500,000 steps. In some embodiments, the model may be optimized using an Adam optimizer, with a batch size of 4. For example, the learning rate value may be set to $10^{-4}$ for the first 200,000 steps and then be decreased to $10^{-5}$ for the rest of the training. In one or more embodiments, the end-to-end compression model may be trained to minimize distortion (measured by a distortion metric such as MSE or MS-SSIM), for example through minimizing a loss function which may be chosen of the form: $J=D+\lambda \cdot R$, where D refers to the distortion measured for example by the MSE or MS-SSIM metrics, and R refers to the rate used to transmit the bitstream, for example estimated using the Shannon entropy, and $\lambda$ is the Lagrangian multiplier, allowing to adapt the bit rate targeted by the model.

For example, eight models may be trained, that is, 4 for each quality metric (MSE and MS-SSIM), matching 4 different bit rates. The corresponding Lagrangian multipliers may be set to $\lambda=\{420, 220, 120, 64\}$ for MS-SSIM models and $\lambda=\{4096, 3140, 2048, 1024\}$ for MSE models.

While the present disclosure has been described with respect to preferred embodiments, those skilled in the art will readily appreciate that various changes and/or modifications can be made to the disclosure without departing from the spirit or scope of the disclosure as defined by the appended claims.

Although the present disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for encoding image data of an image divided into a plurality of pixel blocks using a machine learning algorithm, the method comprising, by a computing platform comprising a processor configured for implementing the machine learning algorithm, for a block of the pixel blocks:

obtaining a block neighborhood set of at least one pixel of the image, wherein the at least one pixel is located outside the block in a spatial neighborhood of a corresponding pixel located on an edge of the block; and generating, by the machine learning algorithm, a bit-stream representing the encoded block, by executing during an inference phase the machine learning algorithm for encoding the block based on input data comprising the block and the block neighborhood set input to the machine learning algorithm, the method further comprising:

performing training of the machine learning algorithm, the training comprising, for encoding training image data of a training image divided into a plurality of training blocks by the machine learning algorithm, for a training block of the pixel blocks:

obtaining a training block neighborhood set of at least one pixel of the training image, wherein the at least one pixel is located outside the training block in a spatial neighborhood of a corresponding pixel located on an edge of the training block;

generating, by the machine learning algorithm, a bit-stream representing the encoded training block, by executing during a training phase the machine learning algorithm for encoding the training block based on input training data comprising the training block and the training block neighborhood set input to the machine learning algorithm;

generating, by executing during the training phase the machine learning algorithm for encoding the training block, a reconstructed training block by end-to-end compression of the training block comprising decoding the bitstream; and determining a value of a distortion metric between pixels of the pixel blocks and reconstructed pixels of the reconstructed training block, wherein the distortion metric uses a distance between the at least one pixel of the training block neighborhood set and a pixel reconstructed from the corresponding pixel of the training block, wherein the training block forms a M×N matrix of pixels p(x, y), wherein x=0, ..., N−1, y=0, ..., M−1, wherein the reconstructed training block corresponding to the training block forms a M×N matrix of pixels p̃(x, y), wherein x=0, ..., N−1, y=0, ..., M−1.

2. The method according to claim 1, wherein the block neighborhood set comprises a plurality of pixels respectively co-located outside the block in respective spatial neighborhoods of corresponding pixels located on respective edges of the block.

3. The method according to claim 1, further comprising;

obtaining a block extended neighborhood set of a plurality of pixels located outside the block in a spatial neighborhood of respectively corresponding pixels located on one or more edges of the pixel block; and determining the block neighborhood set based on a filtering of pixels of the block extended neighborhood set.

4. The method according to claim 3, wherein the filtering of the pixels uses one or more of a Mean filter and a Gaussian filter.

5. The method according to claim 1, further comprising: performing training of the machine learning algorithm, the training comprising, for encoding training image data of a training image divided into a plurality of training blocks by the machine learning algorithm, for a training block of the pixel blocks:

obtaining a training block neighborhood set of at least one pixel of the training image, wherein the at least one pixel is located outside the training block in a spatial neighborhood of a corresponding pixel located on an edge of the training block;

generating, by the machine learning algorithm, a bit-stream representing the encoded training block, by encoding the training block based on input training data comprising the training block and the training block neighborhood set;

generating, by the machine learning algorithm, a reconstructed training block by end-to-end compression of the training block comprising decoding the bitstream; and determining a value of a distortion metric between pixels of the pixel blocks and reconstructed pixels of the reconstructed training block, wherein the distortion metric uses a distance between the at least one pixel of the training block neighborhood set and a pixel reconstructed from the corresponding pixel of the training block.

6. The method according to claim 5, wherein the training block neighborhood set comprises a plurality of pixels respectively co-located outside the training block with respective pixels reconstructed from corresponding pixels located on respective edges of the training block, wherein the distortion metric uses respective distances between pixels of the plurality of pixels and respectively corresponding pixels of the training block.

7. The method according to claim 5, wherein the distortion metric further uses respective distances between pixels of the training blocks and corresponding reconstructed pixels output by the machine learning algorithm through coding and decoding the pixels of the training block.

8. The method according to claim 5, further comprising: determining a value of a rate-distortion cost function J based on the value of the distortion metric.

9. The method according to claim 8, wherein the rate-distortion cost function is of the form $J=R+\lambda \cdot D$, where D is the value of the distortion metric, $\lambda$ is a Lagrangian parameter, and R is an overall bitrate measurement.

10. The method of claim 5, wherein the training block forms a M×N matrix of pixels p(x, y), wherein x=0, ..., N−1, y=0, ..., M−1, wherein the reconstructed training block corresponding to the training block forms a M×N matrix of pixels p̃(x, y), wherein x=0, ..., N−1, y=0, ..., M−1, and wherein the distortion metric uses one or more of the following distances:

$$\sum\nolimits_{y=0}^{M-1}(p(-1,\, y)-\tilde{p}(0,\, y))^2,$$

$$\sum\nolimits_{x=0}^{N-1}(p(x,\, -1)-\tilde{p}(x,\, 0))^2,$$

$$\sum\nolimits_{y=0}^{M-1}(p(M,\, y)-\tilde{p}(M-1,\, y))^2, \text{ and}$$

$$\sum\nolimits_{x=0}^{N-1}(p(x,\, N)-\tilde{p}(x,\, N-1))^2,$$

wherein p(−1, y) with y=0, ..., M−1 are pixels of a first training block neighborhood subset of the training block neighborhood set, p(x, −1) with x=0, ..., N−1 are pixels of a second block neighborhood subset of the training block neighborhood set, p(M, y) with y=0, ..., M−1 are pixels of a third block neighborhood subset of the training block neighborhood set, and p(x, N) with x=0, ..., N−1 are pixels of a fourth block neighborhood subset of the training block neighborhood set.

11. The method according to claim 5, wherein the training block neighborhood set comprises a plurality of pixels respectively co-located outside the training block in respective spatial neighborhoods of corresponding pixels located on respective edges of the training block, wherein the distortion metric uses respective distances between pixels of the plurality of pixels and respectively corresponding pixels of the training block.

12. The method according to claim 5, further comprising:

obtaining a training block extended neighborhood set of a plurality of pixels located outside the training block in a spatial neighborhood of respectively corresponding pixels located on one or more edges of the training block; and determining the training block neighborhood set based on a filtering of pixels of the training block extended neighborhood set.

13. A method for encoding image data using a machine learning algorithm, the method comprising, by a computing platform comprising a processor configured for implementing the machine learning algorithm: performing training of the machine learning algorithm to perform encoding of a training image divided into a plurality of training blocks, the training comprising, for a training block of the training blocks:

obtaining a training block neighborhood set of at least one pixel of the training image, wherein the at least one pixel is located outside the training block in a spatial neighborhood of a corresponding pixel located on an edge of the training block;

generating, by the machine learning algorithm, a bitstream representing the encoded training block, by executing during a training phase the machine learning algorithm for encoding the training block based on input training data comprising the training block and the training block neighborhood set input to the machine learning algorithm;

generating, by the machine learning algorithm, a reconstructed training block by end-to-end compression of the training block comprising decoding the bitstream; and determining a value of a distortion metric between pixels of the pixel blocks and reconstructed pixels of the reconstructed training block, wherein the distortion metric uses a distance between the at least one pixel of the training block neighborhood set and a pixel reconstructed from the corresponding pixel of the training block, wherein the training block forms a M×N matrix of pixels p(x, y), wherein x=0, . . . , N−1, y=0, . . . , M−1, wherein the reconstructed training block corresponding to the training block forms a M×N matrix of pixels p̃(x, y), wherein x=0, . . . , N−1, y=0, . . . , M−1, and wherein the distortion metric uses one or more of the following distances:

$$\sum_{y=0}^{M-1}(p(-1, y) - \tilde{p}(0, y))^2,$$

$$\sum_{x=0}^{N-1}(p(x, -1) - \tilde{p}(x, 0))^2,$$

$$\sum_{y=0}^{M-1}(p(M, y) - \tilde{p}(M-1, y))^2, \text{ and}$$

$$\sum_{x=0}^{N-1}(p(x, N) - \tilde{p}(x, N-1))^2,$$

wherein p(−1, y) with y=0, . . . , M−1 are pixels of a first training block neighborhood subset of the training block neighborhood set, p(x, −1) with x=0, . . . , N−1 are pixels of a second block neighborhood subset of the training block neighborhood set, p(M, y) with y=0, . . . , M−1 are pixels of a third block neighborhood subset of the training block neighborhood set, and p(x, N) with x=0, . . . , N−1 are pixels of a fourth block neighborhood subset of the training block neighborhood set.

14. An apparatus, the apparatus comprising a processor and a memory operatively coupled to the processor, wherein the processor is configured to perform a method for encoding image data of an image divided into a plurality of pixel blocks using a machine learning algorithm, the method comprising, by a computing platform comprising a processor configured for implementing the machine learning algorithm, for a block of the pixel blocks:

obtaining a block neighborhood set of at least one pixel of the image, wherein the at least one pixel is located outside the block in a spatial neighborhood of a corresponding pixel located on an edge of the block; and generating, by the machine learning algorithm, a bitstream representing the encoded block, by executing during an inference phase the machine learning algorithm for encoding the block based on input data comprising the block and the block neighborhood set input to the machine learning algorithm, the method further comprising:

performing training of the machine learning algorithm, the training comprising, for encoding training image data of a training image divided into a plurality of training blocks by the machine learning algorithm, for a training block of the pixel blocks:

obtaining a training block neighborhood set of at least one pixel of the training image, wherein the at least one pixel is located outside the training block in a spatial neighborhood of a corresponding pixel located on an edge of the training block;

generating, by the machine learning algorithm, a bitstream representing the encoded training block, by executing during a training phase the machine learning algorithm for encoding the training block based on input training data comprising the training block and the training block neighborhood set input to the machine learning algorithm;

generating, by executing during the training phase the machine learning algorithm for encoding the training block, a reconstructed training block by end-to-end compression of the training block comprising decoding the bitstream; and determining a value of a distortion metric between pixels of the pixel blocks and reconstructed pixels of the reconstructed training block, wherein the distortion metric uses a distance between the at least one pixel of the training block neighborhood set and a pixel reconstructed from the corresponding pixel of the training block, wherein the training block forms a M×N matrix of pixels p(x, y), wherein x=0, . . . , N−1, y=0, . . . , M−1, wherein the reconstructed training block corresponding to the training block forms a M×N matrix of pixels p̃(x, y), wherein x=0, . . . , N−1, y=0, . . . , M−1, and wherein the distortion metric uses one or more of the following distances:

$$\sum_{y=0}^{M-1}(p(-1, y) - \tilde{p}(0, y))^2,$$

$$\sum_{x=0}^{N-1}(p(x, -1) - \tilde{p}(x, 0))^2,$$

-continued $$\sum_{y=0}^{M-1} (p(M, y) - \tilde{p}(M-1, y))^2, \text{ and}$$

$$\sum_{x=0}^{N-1} (p(x, N) - \tilde{p}(x, N-1))^2,$$

wherein $p(-1, y)$ with $y=0, \ldots, M-1$ are pixels of a first training block neighborhood subset of the training block neighborhood set, $p(x, -1)$ with $x=0, \ldots, N-1$ are pixels of a second block neighborhood subset of the training block neighborhood set, $p(M, y)$ with $y=0, \ldots, M-1$ are pixels of a third block neighborhood subset of the training block neighborhood set, and $p(x, N)$ with $x=0, \ldots, N-1$ are pixels of a fourth block neighborhood subset of the training block neighborhood set.

15. A non-transitory computer-readable medium encoded with executable instructions which, when executed, causes an apparatus comprising a processor operatively coupled with a memory, to perform a method for encoding image data of an image divided into a plurality of pixel blocks using a machine learning algorithm, the method comprising, by a computing platform comprising a processor configured for implementing the machine learning algorithm, for a block of the pixel blocks:

obtaining a block neighborhood set of at least one pixel of the image, wherein the at least one pixel is located outside the block in a spatial neighborhood of a corresponding pixel located on an edge of the block; and generating, by the machine learning algorithm, a bitstream representing the encoded block, by executing during an inference phase the machine learning algorithm for encoding the block based on input data comprising the block and the block neighborhood set input to the machine learning algorithm, the method further comprising:

performing training of the machine learning algorithm, the training comprising, for encoding training image data of a training image divided into a plurality of training blocks by the machine learning algorithm, for a training block of the pixel blocks:

obtaining a training block neighborhood set of at least one pixel of the training image, wherein the at least one pixel is located outside the training block in a spatial neighborhood of a corresponding pixel located on an edge of the training block;

generating, by the machine learning algorithm, a bitstream representing the encoded training block, by executing during a training phase the machine learning algorithm for encoding the training block based on input training data comprising the training block and the training block neighborhood set input to the machine learning algorithm;

generating, by executing during the training phase the machine learning algorithm for encoding the training block, a reconstructed training block by end-to-end compression of the training block comprising decoding the bitstream; and determining a value of a distortion metric between pixels of the pixel blocks and reconstructed pixels of the reconstructed training block, wherein the distortion metric uses a distance between the at least one pixel of the training block neighborhood set and a pixel reconstructed from the corresponding pixel of the training block, wherein the training block forms a M×N matrix of pixels $p(x, y)$, wherein $x=0, \ldots, N-1$, $y=0, \ldots, M-1$, wherein the reconstructed training block corresponding to the training block forms a M×N matrix of pixels $\tilde{p}(x, y)$, wherein $x=0, \ldots, N-1$, $y=0, \ldots, M-1$, and wherein the distortion metric uses one or more of the following distances:

$$\sum_{y=0}^{M-1} (p(-1, y) - \tilde{p}(0, y))^2,$$

$$\sum_{x=0}^{N-1} (p(x, -1) - \tilde{p}(x, 0))^2,$$

$$\sum_{y=0}^{M-1} (p(M, y) - \tilde{p}(M-1, y))^2, \text{ and}$$

$$\sum_{x=0}^{N-1} (p(x, N) - \tilde{p}(x, N-1))^2,$$

wherein $p(-1, y)$ with $y=0, \ldots, M-1$ are pixels of a first training block neighborhood subset of the training block neighborhood set, $p(x, -1)$ with $x=0, \ldots, N-1$ are pixels of a second block neighborhood subset of the training block neighborhood set, $p(M, y)$ with $y=0, \ldots, M-1$ are pixels of a third block neighborhood subset of the training block neighborhood set, and $p(x, N)$ with $x=0, \ldots, N-1$ are pixels of a fourth block neighborhood subset of the training block neighborhood set.

16. The apparatus according to claim 14, wherein the block neighborhood set comprises a plurality of pixels respectively co-located outside the block in respective spatial neighborhoods of corresponding pixels located on respective edges of the block.

17. The apparatus according to claim 14, further comprising:

obtaining a block extended neighborhood set of a plurality of pixels located outside the block in a spatial neighborhood of respectively corresponding pixels located on one or more edges of the pixel block; and determining the block neighborhood set based on a filtering of pixels of the block extended neighborhood set.

18. The apparatus according to claim 17, wherein the filtering of the pixels uses one or more of a Mean filter and a Gaussian filter.

19. The non-transitory computer-readable medium according to claim 15, wherein the block neighborhood set comprises a plurality of pixels respectively co-located outside the block in respective spatial neighborhoods of corresponding pixels located on respective edges of the block.

20. The non-transitory computer-readable medium according to claim 15, further comprising:

obtaining a block extended neighborhood set of a plurality of pixels located outside the block in a spatial neighborhood of respectively corresponding pixels located on one or more edges of the pixel block; and determining the block neighborhood set based on a filtering of pixels of the block extended neighborhood set.

* * * * *